United States Patent
Zhao et al.

(10) Patent No.: US 6,690,857 B2
(45) Date of Patent: *Feb. 10, 2004

(54) FIBER DEVICES HAVING SIDE EVANESCENT COUPLING PORT

(75) Inventors: Shulai Zhao, Encinitas, CA (US); Bo Pi, Carlsbad, CA (US)

(73) Assignee: Oluma, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/309,523

(22) Filed: Dec. 3, 2002

(65) Prior Publication Data

US 2004/0008935 A1 Jan. 15, 2004

Related U.S. Application Data

(63) Continuation of application No. 09/905,038, filed on Jul. 12, 2001, now Pat. No. 6,490,391, which is a continuation-in-part of application No. 09/796,373, filed on Feb. 27, 2001, now Pat. No. 6,516,114.
(60) Provisional application No. 60/217,822, filed on Jul. 12, 2000, provisional application No. 60/217,832, filed on Jul. 12, 2000, provisional application No. 60/217,813, filed on Jul. 12, 2000, and provisional application No. 60/217,573, filed on Jul. 12, 2000.

(51) Int. Cl.[7] .................................................. G02B 6/26
(52) U.S. Cl. ............................. 385/30; 385/15; 385/31; 385/39
(58) Field of Search ........................ 385/15, 18, 30–32, 385/39, 47, 50, 65, 83, 129, 130, 131, 132, 137

(56) References Cited

U.S. PATENT DOCUMENTS 4,021,097 A    5/1977   McMahon
4,136,929 A    1/1979   Suzaki
4,259,016 A    3/1981   Schiffner
4,301,543 A   11/1981   Palmer
4,302,071 A   11/1981   Winzer
4,307,933 A   12/1981   Palmer et al.
4,315,666 A    2/1982   Hicks, Jr.
4,378,539 A    3/1983   Swanson
4,392,712 A    7/1983   Ozeki
4,431,260 A    2/1984   Palmer
4,493,528 A    1/1985   Shaw et al.
4,536,058 A    8/1985   Shaw et al.
4,556,279 A   12/1985   Shaw et al.
4,564,262 A    1/1986   Shaw
4,601,541 A    7/1986   Shaw et al.
4,688,882 A    8/1987   Failes
4,828,350 A    5/1989   Kim et al.

(List continued on next page.)

FOREIGN PATENT DOCUMENTS

DE    28 12 346 A1    3/1978
EP    0178045 A1    4/1986

(List continued on next page.)

OTHER PUBLICATIONS

McCallion et al., "Side–polished fiber provides functionality and transparency," (Abstract) Laser Focus World, vol. 34, No. 9, p. S19–20, S22, S24, PennWell Publishing, Sep., 1998.

(List continued on next page.)

*Primary Examiner*—John D. Lee
*Assistant Examiner*—Jennifer Doan
(74) *Attorney, Agent, or Firm*—Fish & Richardson P.C.

(57) ABSTRACT

Fiber optical devices formed on substrates fabricated with grooves that operate based on evanescent optical coupling through a side-polished fiber surface in each fiber involved.

16 Claims, 18 Drawing Sheets

U.S. PATENT DOCUMENTS

| | | |
|---|---|---|
| 4,869,567 A | 9/1989 | Millar et al. |
| 4,896,932 A | 1/1990 | Cassidy |
| 4,900,118 A | 2/1990 | Yanagawa et al. |
| 4,986,624 A | 1/1991 | Sorin et al. |
| 4,991,922 A | 2/1991 | Dahlgren |
| 5,029,961 A | 7/1991 | Suzuki et al. |
| 5,042,896 A | 8/1991 | Dahlgren |
| 5,100,219 A | 3/1992 | Takahashi |
| 5,329,607 A | 7/1994 | Kamikawa et al. |
| 5,444,723 A | 8/1995 | Chandonnet et al. |
| 5,533,155 A | 7/1996 | Barberio et al. |
| 5,586,205 A | 12/1996 | Chen et al. |
| 5,623,567 A | 4/1997 | Barberio et al. |
| 5,651,085 A | 7/1997 | Chia |
| 5,729,641 A | 3/1998 | Chandonnet et al. |
| 5,781,675 A | 7/1998 | Tseng et al. |
| 5,809,188 A | 9/1998 | Tseng et al. |
| 5,841,926 A | 11/1998 | Takeuchi et al. |
| 5,854,864 A | 12/1998 | Knoesen et al. |
| 5,892,857 A | 4/1999 | McCallion |
| 5,900,983 A | 5/1999 | Ford et al. |
| 5,903,685 A | 5/1999 | Jones et al. |
| 5,915,063 A | 6/1999 | Colbourne et al. |
| 5,940,556 A | 8/1999 | Moslehi et al. |
| 5,963,291 A | 10/1999 | Wu et al. |
| 5,966,493 A | 10/1999 | Wagoner et al. |
| 5,970,201 A | 10/1999 | Anthony et al. |
| 6,011,881 A | 1/2000 | Moslehi et al. |
| 6,026,205 A | 2/2000 | McCallion et al. |
| 6,038,359 A | 3/2000 | Moslehi et al. |
| 6,052,220 A | 4/2000 | Lawrence et al. |
| 6,058,226 A | 5/2000 | Starodubov |
| 6,130,984 A | 10/2000 | Shen et al. |
| 6,134,360 A | 10/2000 | Cheng et al. |
| 6,144,793 A | 11/2000 | Matsumoto et al. |
| 6,185,358 B1 | 2/2001 | Park |
| 6,490,391 B1 * | 12/2002 | Zhao et al. .................. 385/30 |
| 6,516,114 B2 * | 2/2003 | Zhao et al. .................. 385/30 |

FOREIGN PATENT DOCUMENTS

| | | |
|---|---|---|
| FR | 2613844 A1 | 10/1988 |
| JP | 52-14430 A2 | 2/1977 |
| JP | 52-24539 | 2/1977 |
| JP | 53-91752 A2 | 8/1978 |
| JP | 54-4153 A2 | 1/1979 |
| JP | 54-8542 | 1/1979 |
| JP | 54-68651 | 1/1979 |
| JP | 54-101334 A2 | 8/1979 |
| JP | 54-118255 A2 | 9/1979 |
| JP | 56-85702 | 7/1981 |
| JP | 58-10701 | 1/1983 |
| JP | 60-131503 | 7/1985 |
| JP | 64-50003 | 2/1989 |
| JP | 1-130106 | 5/1989 |
| JP | 1-222205 | 9/1989 |
| JP | 1-255803 | 10/1989 |
| JP | 4-31801 | 2/1992 |
| WO | WO 87/03676 | 6/1987 |

OTHER PUBLICATIONS

Das et al., "Automatic determination of the remaining cladding thickness of a single–mode fiber half–coupler," (Abstract) Optics Letters, vol. 19, No. 6, p. 384–6, Mar. 15, 1994.

Ishikawa et al., "A new optical attenuator using the thermal diffusion of W–cladding fiber," (Abstract) MOC/GRIN '97 Technical Digest of the 6th Microoptics Conf./14th Topical Meeting on Gradient–Index Optical Systems in Tokyo, Japan, p. (vii+432+27), 208–11, Oct. 1997.

Matejec et al., "Optical fiber with novel geometry for evanescent–wave sensing," (Abstract) Sensors and Actuators B, (Chemical), vol. B29, No. 1–3, p. 416–22, Elsevier Publishing, Oct. 1995.

Alonso et al., "Single–mode, optical–fiber sensors and tunable wavelength filters based on the resonant excitation of metal–clad modes," (Abstract) Applied Optics, vol. 33, No. 22, p. 5197–201, Aug. 1, 1994.

Tomita et al., "Leaky–mode loss of the second propagating mode in single–mode fibres with index well profiles," (Abstract) Applied Optics, vol. 24, No. 11, p. 1704–7, Jun. 1, 1995.

Leminger et al., "Determination of the variable core–to–surface spacing of single–mode fiber–coupler blocks," (Abstract) Optics Letters, vol. 12, No. 3, p. 211–13, Mar., 1987.

Morshnev et al., "A fiber thermo–optical attenuator," (Abstract) Source: Radioteknika i Elektronika, Translated in: Soviet Journal of Communications Technology & Electronics, vol. 30, No. 9, p. 148–50, Sep., 1985.

Takahashi Mitsuo, "Variable light attenuator of improved air–gap type with extremely low returning light," (Abstract) Conf. Record—IEEE Instrumentation and Measurement Tech. Conf. 2, p. 947–950, 1994.

Schmidt et al., "New design approach for a programmable optical attenuator," (Abstract) Hewlett–Packard Journal, v. 46, n. 1, p. 34–39, 1995.

Hayata et al., "Algebraically decaying modes of dielectric planar waveguides," Optics Letters, vol. 20, No. 10, p. 1131–32, May 15, 1995.

Vengsarkar et al., "Photoinduced refractive–index changes in two–mode, elliptical–core fibers: sensing applications," Optics Letters, vol. 16, No. 19, p. 1541–43, Oct. 1, 1991.

Pantchev et al., "Method of Refractive Index Profile Reconstruction from Effective Index of Planar Optical Monomode Waveguides: Application to Potassium Ion–Exchanged Waveguides," IEEE Journal of Quantum Electronics, vol. 29, No. 1, p. 154–60, Jan. 1993.

Ikeda et al., "Analysis of the Attenuation Ratio of MQW Optical Intensity Modulator for 1.55 $\mu$m Wavelength Taking Account of Electron Wave Function Leakage," IEEE Journal of Quantum Electronics, vol. 32, No. 2, p. 284–92, Feb. 1996.

S. Masuda, "Variable attenuator for use in single–mode fiber transmission systems," Applied Optics, vol. 19, No. 14, p. 2435–38, Jul. 15, 1980.

Huang et al., "Field–Induced Waveguides and Their Application to Modulators," IEEE Journal of Quantum Electronics, vol. 29, No. 4, p. 1131–1143, Apr. 1993.

Iztkovich et al., "In–Situ Investigation of Coupling Between a Fibre and a Slab Waveguide," Tel Aviv University, Israel, May 29, 1990.

Brierley et al., "Amplitude and phase characterization of polished directional half–couplers with variable refractive index overlays," Optical Engineering, vol. 27, No. 1, p. 045–49, Jan. 1988.

Scholl et al., "In–line fiber optical attenuator and powermeter," SPIE vol. 1792 Components for Fiber Optic Applications VII, p. 65–70, 1992.

Tsujimoto et al., "Fabrication of Low–Loss 3 dB Couplers With Multimode Optical Fibres," Electronics Letters, vol. 14, No. 5, Mar. 2, 1978.

* cited by examiner

FIBER DEVICES HAVING SIDE EVANESCENT COUPLING PORT

This application is a continuation application of U.S. application Ser. No. 09/905,038 filed on Jul. 12, 2001 and issued as U.S. Pat. No. 6,490,391 on Dec. 3, 2002. The U.S. application Ser. No. 09/905,038 is a continuation-in-part of U.S. application Ser. No. 09/796,373 entitled "INTEGRATION OF FIBERS ON SUBSTRATE WITH GROOVES" and filed on Feb. 27, 2001, now U.S. Pat. No. 6,516,110 and claims the benefit of U.S. Provisional Application Nos. 60/217,822 entitled "AN OPTIC FIBER BASED RING RESONATOR," 60/217,832 entitled "INTEGRATED OPTIC SPLITTER," 60/217,813 entitled "OPTIC FIBER BASED SWITCH," and 60/217,573 entitled "A FIBER BASED ADD AND DROP MULTIPLEXER", all of which were filed on Jul. 12, 2000. All disclosures of the above prior applications are incorporated herein by reference as part of this application.

BACKGROUND

This application relates to optical fiber devices, and more specifically, to fiber devices based on evanescent coupling.

Optical waves may be transported through optical waveguiding elements or "light pipes" such as optical fibers. A typical fiber may be simplified as a fiber core and a cladding layer surrounding the fiber core. The refractive index of the fiber core is higher than that of the fiber cladding to confine the light. Light rays that are coupled into the fiber core within a maximum angle with respect to the axis of the fiber core are totally reflected at the interface of the fiber core and the cladding. This total internal reflection provides a mechanism for spatially confining the optical energy of the light rays in one or more selected fiber modes to guide the optical energy along the fiber core. Optical fibers may be used in transmission and delivery of optical signals from one location to another in a variety of optical systems, including but not limited to, fiber devices, fiber links and fiber networks for data communications and telecommunications. In addition, optical fibers may be used to form various optical devices to modify, filter, or process guided optical energy.

The guided optical energy in a fiber, however, is not completely confined within the core of the fiber. A portion of the optical energy can "leak" through the interface between the fiber core and the cladding via an evanescent field that essentially decays exponentially with the distance from the core-cladding interface. The distance for a decay in the electric field of the guided light by a factor of e≈2.718 is about one wavelength of the guided optical energy. This evanescent leakage may be used to couple optical energy into or out of the fiber core, or alternatively, to perturb the guided optical energy in the fiber core.

BRIEF DESCRIPTION OF THE DRAWINGS

Like reference symbols in the various drawings indicate like elements.

DETAILED DESCRIPTION

The devices and techniques of this application use at least one fiber integrated on or engaged to a substrate fabricated with one or more grooves. One portion of the cladding of this fiber is removed and polished to form a fiber coupling port. The fiber coupling port has a surface that is sufficiently close to the fiber core so that optical energy can be coupled through via evanescent fields out of or into the fiber core.

The following first describes in detail the basic structures for integrating or engaging a fiber to a substrate with at least one fiber coupling port. Next, embodiments of various optical devices based on such fiber modules are described, including fiber ring resonators, fiber switches, fiber optical splitters, and fiber add/drop multiplexers.

Figure 2B:
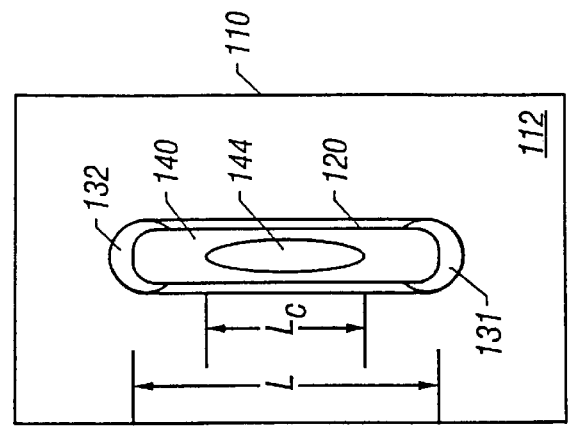
FIGS. 2A and 2B show a cross sectional view of the device in FIG. 1 along the direction AA' and a side view of the device in FIG. 1 along the direction BB', respectively.
Figure 1:
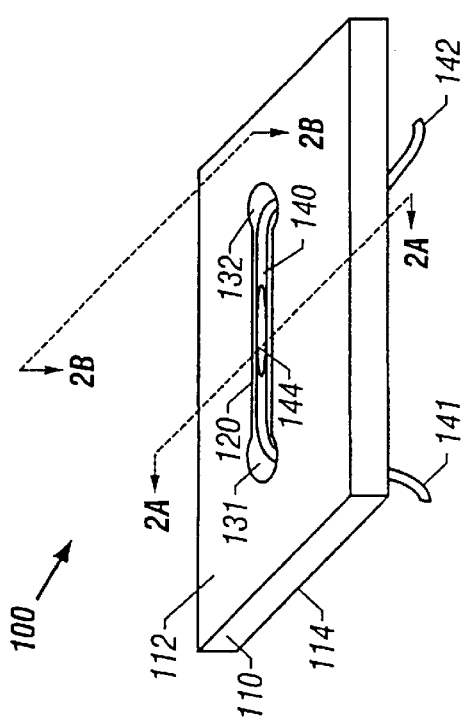
FIG. 1 shows one embodiment of a fiber device that integrates or engages a fiber to a substrate with a groove for positioning the fiber and openings for holding the fiber.
Figure 2A:
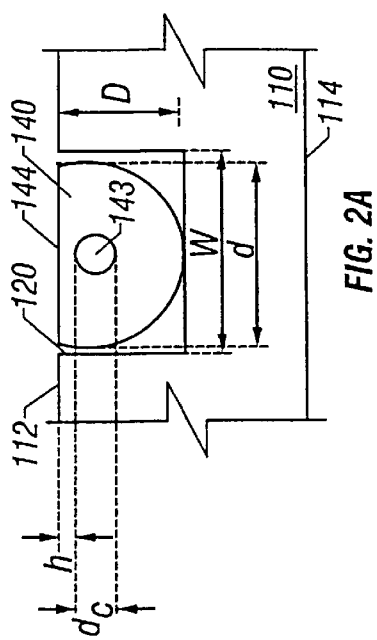

FIG. 1 shows one embodiment of a fiber device 100 where a fiber 140 is integrated or engaged to a substrate 110. The fiber device 100 may be used as a building block to construct a variety of fiber devices, including but not limited to, fiber couplers, fiber attenuators, fiber modulators, fiber beam splitters, optical fiber switches, and fiber frequency-division multiplexers. FIGS. 2A and 2B show additional details of the fiber device 100.

The substrate 110 may be formed of various materials, such as semiconductors, insulators including dielectric materials (e.g., a glass, a quartz, a crystal, etc), metallic materials, or any other solid-state materials that can be processed to form the device features such as grooves and through holes disclosed herein. Two parallel and opposing substrate surfaces, 112 and 114, are generally flat and may be polished. An elongated groove 120 is formed in the substrate 110 on the surface 112 and is essentially a recess from the surface 112. The groove 120 may be fabricated by removing a portion of the material from the substrate 110 through etching or other processes.

The geometry of the groove 120 is generally elongated along a straight line as illustrated or along a curved line. Unless otherwise indicated, the following description will use straight-line grooves as examples. Some embodiments are described with specific reference to groove with V-shaped cross sections as shown by the groove 310 in FIG. 3B. The cross sections are generally not so limited and may also be other shapes as well, including rectangular as shown in FIG. 2A, U-shaped as shown by the groove 310 in FIG. 3A, a circularly shape or other suitable shapes.

The width, W, of the groove 120 is generally greater than the diameter, d, of the fiber 140 and may either remain a constant or vary spatially along the groove 120, e.g., increasing from the center towards the two ends. The length, L, of the groove 120 may vary from one grove to another and can be determined based on specific requirements of applications. The depth D of the groove 120 may be a constant or may vary along the groove 120, e.g., increasing from the center towards the two ends. In general, at least a portion of the groove 120 has a depth D to expose a portion of the fiber cladding of the fiber 140 above the surface 112 while still keeping the fiber core below the surface 112. Sometimes, the depth D of the groove 120 may also be selected to expose the fiber core. Other portions of the groove 120 may have a different depth so that the fiber can be placed within the groove 120 under the substrate surface 112. Depending on the geometry of the groove 120 (e.g., the apex angle of a V-shaped groove), the depth D of the entire groove 120 may be greater than fiber diameter d. For a groove with a rectangular cross section as shown in FIG. 2A, at least a portion of the groove 120 has a depth D less than the fiber diameter d but greater than the sum of the fiber radius r=d/2 and radius of the fiber core rc=dc/2. This portion of the groove 120 exposes partial fiber cladding of the fiber 140 above the surface 112 while still keeping the fiber core below the surface 112. Other portions of the groove 120 may have a depth that is at least the fiber diameter d so that the fiber can be essentially placed in the groove 120 below the surface 112. However, in certain applications such as the device shown in FIG. 12, the depth D of the entire groove 120 may be greater than fiber diameter d. Unless otherwise indicated, the following description will assume that at least a portion of a groove 120 to expose a portion of the fiber cladding above the surface 112 and adjacent portions sufficiently deep to keep the fiber below the surface 112. In case of the rectangular groove 120, the central portion of the groove 120 may have a depth D less than d but greater than (d+dc)/2 while the portions on either sides of the central portion may have a depth equal to or greater than the fiber diameter d.

Notably, the fiber device 100 includes two openings 131 and 132 that are respectively formed at the two ends of the groove 120 and penetrate through the substrate 110. Hence, the openings 131 and 132 are through holes extending between the two surfaces 112 and provide access from one surface (112 or 114) to another. The spacing between the openings 131 and 132 essentially determines the length L of the groove 120. The aperture of the openings 131 and 132 should be sufficiently large to receive the fiber 140, e.g., with a diameter greater than the diameter of the fiber 140. The shape of the holes 131 and 132 may generally be in any suitable geometry.

A portion of the fiber 140 is placed in the groove 120 near the surface 112. The remaining portions 141, 142 of the fiber 140 on both sides of the portion in the groove 120 are respectively fed through the first and second openings 131, 132 to the other side 114 of the substrate 110. After being placed in the substrate 110 as shown in FIG. 1, the fiber 140 may be slightly pulled by moving the fiber portions 141 and 142 in opposite directions so that the portion of the fiber 140 in the groove 120 is in substantially full contact with the groove 120.

Since a portion of the groove 120 has a depth D less than the fiber diameter d, the cladding of the fiber 140 in this portion protrudes out of the surface 112. The fiber core in this portion of the fiber is generally kept under the surface 112. For example, the cladding of a central portion of the fiber 140 between the holes 131 and 132 may be exposed. This protruded or exposed cladding is then removed and polished to form a flat surface 144 of a length Lc that is above the fiber core 143 and is substantially coplanar with the surface 112 of the substrate 110. When the spacing, h, between the flat surface 144 and the fiber core 142 is sufficiently small (e.g., on the order of or less than one wavelength of optical energy), the flat surface 144 can be used to couple optical energy into or out of the fiber core 144 through the evanescent fields outside the fiber core. Hence, the length, Lc, of the flat surface 144 approximately represents the optical coupling length for the fiber device 100.

Figure 3B:
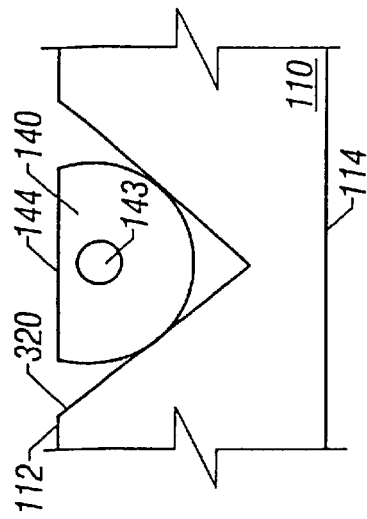
FIGS. 3A and 3B show examples of two different cross sections for grooves shown in FIG. 1.
Figure 4B:
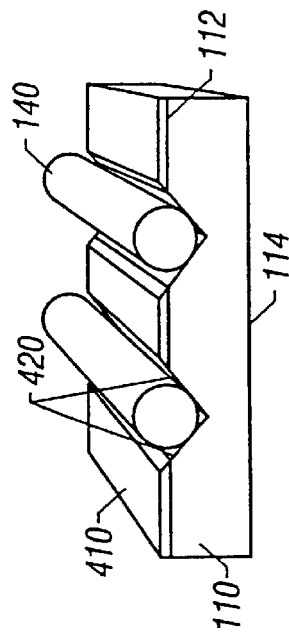
FIGS. 4A, 4B, 5A, 5B, 5C, 5D, and 5E illustrate a process of fabricating V grooves in semiconductor substrates by anistropic etching.
Figure 3A:
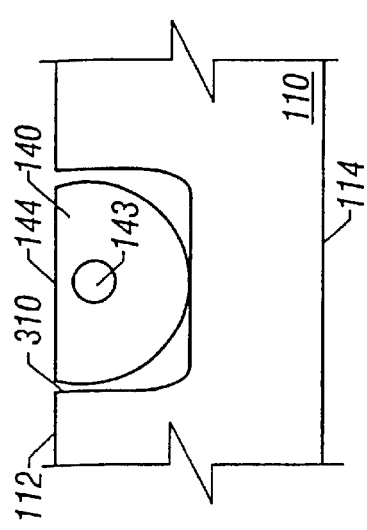
Figure 4A:
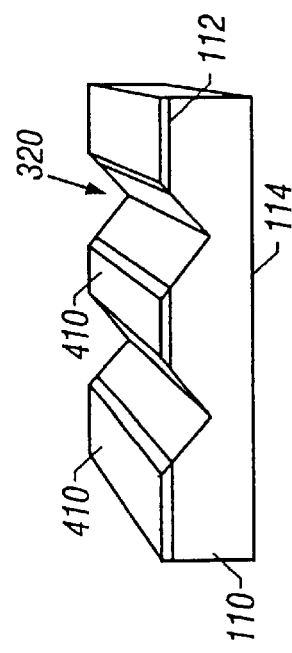

FIGS. 4A and 4B illustrate the fabrication of the V groove 320 and placement of the fiber 140 in the V groove 320 as shown in FIG. 3B. First, a mask layer 410 is deposited over the surface 112 of the substrate 110 and is patterned by a suitable technique such as a photolithography process to have one or more groove areas exposing the underlying substrate 110. Next, the exposed portions of the substrate 110 are anistropically etched to form V grooves.

If the substrate 110 is formed of a semiconductor, e.g., silicon, a thermally-grown silicon oxide or nitride film may be used as the etching mask 410 for anisotropic silicon etching. When the surface 112 is in the crystalline plane (100) of the Si substrate 110 and the groove patterns in the etching mask 410 are parallel to the crystalline plane (110), an etchant chemical such as alkaline (KOH) can be applied on the silicon (100) surface to produce truncated v-shaped grooves. Since the anisotropic etching is stopped at the crystalline plane (111), the dimension of the V grooves, such as the groove width and depth can be accurately controlled by properly selecting the dimension of the groove patterns formed in the etching mask 410.

Referring to FIG. 4B, after the grooves 320 are formed, the fibers 140 can be placed in the grooves 320 and bonded to the groves 320 at locations 420. The bonding may be implemented by a number of techniques, including but not limited to using an epoxy, glass frit thermal bond, or CO2 assisted thermal bond. When multiple grooves 320 are formed, an array of fibers 140 can be precisely aligned in the grooves 320 with a predetermined spacing. The exposed cladding of the fiber 140 can then be removed and polished to form the flat surface 144 as shown in FIG. 3B.

Figure 5C:
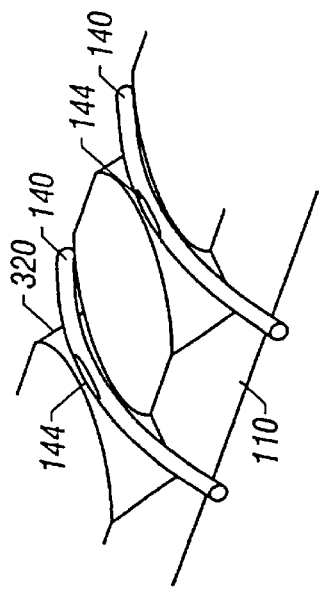
Figure 5B:
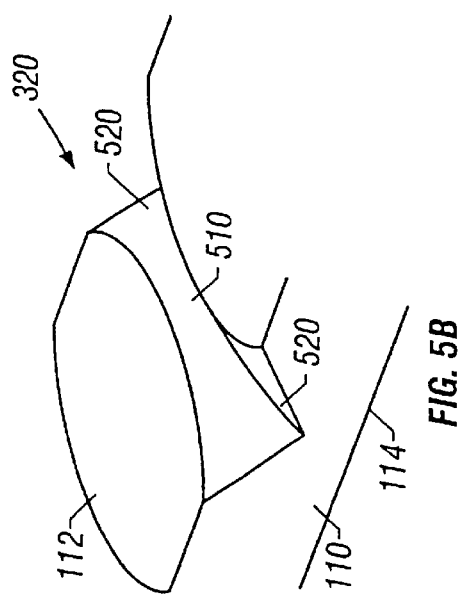
Figure 5A:
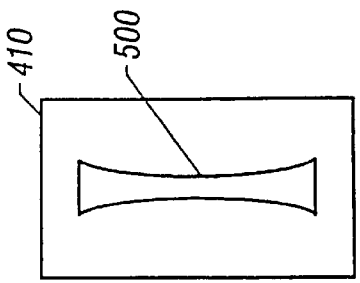
Figure 5E:
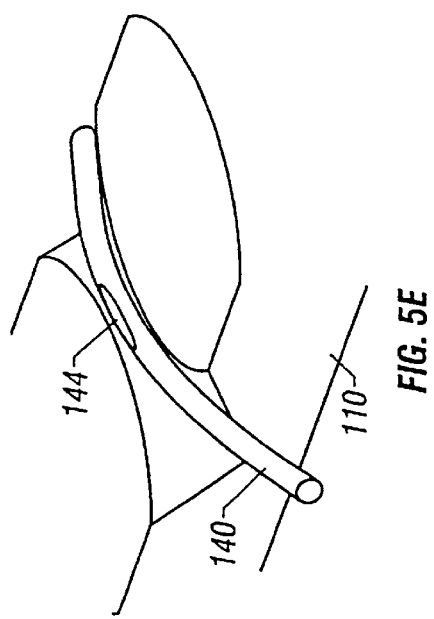
Figure 5D:
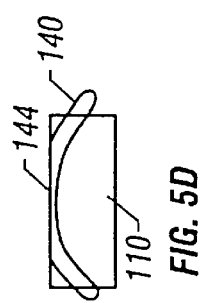

FIG. 5A shows one exemplary groove pattern 500 formed in the etching mask layer 430 in FIG. 4A. FIG. 5B illustrates the corresponding V groove 320 in the silicon substrate 110 formed from the anistropic etching by using the mask 500. The opening of the groove pattern 500 is designed to gradually widen from the center to both sides along the groove to be formed. Accordingly, the width and depth of the underlying V groove 320 also increase from the center portion 510 to side portions 520 that are spaced from the center along the groove 320. As illustrated, the surfaces of the V groove 320 are not flat but are curved as a result of etching through the above mask 500. FIGS. 5C, 5D, and 5E show the placement of fibers 140 in the above V-groove structure.

Figure 6:
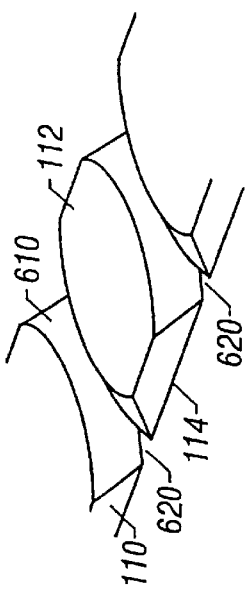
FIG. 6 illustrates formation of openings in V grooves by anistropc etching.

The above anistropic etching may be used to form both the V groove 320 and the openings 131 and 132 at both sides of the V groove 320 as shown in FIG. 1. Referring to FIG. 6, when opening of the groove pattern 500 in the etching mask 410 is sufficiently wide, side portions 620 of the V groove 610 can extend all the way through the substrate 110 from the surface 112 to the opposite surface 114 and hence create an opening 620 on the surface 114. The openings 620, therefore, can be used as the openings 131 and 132 to allow the fiber 140 to go through the substrate 110 from the surface 112 to the opposite surface 114.

Figure 7A:
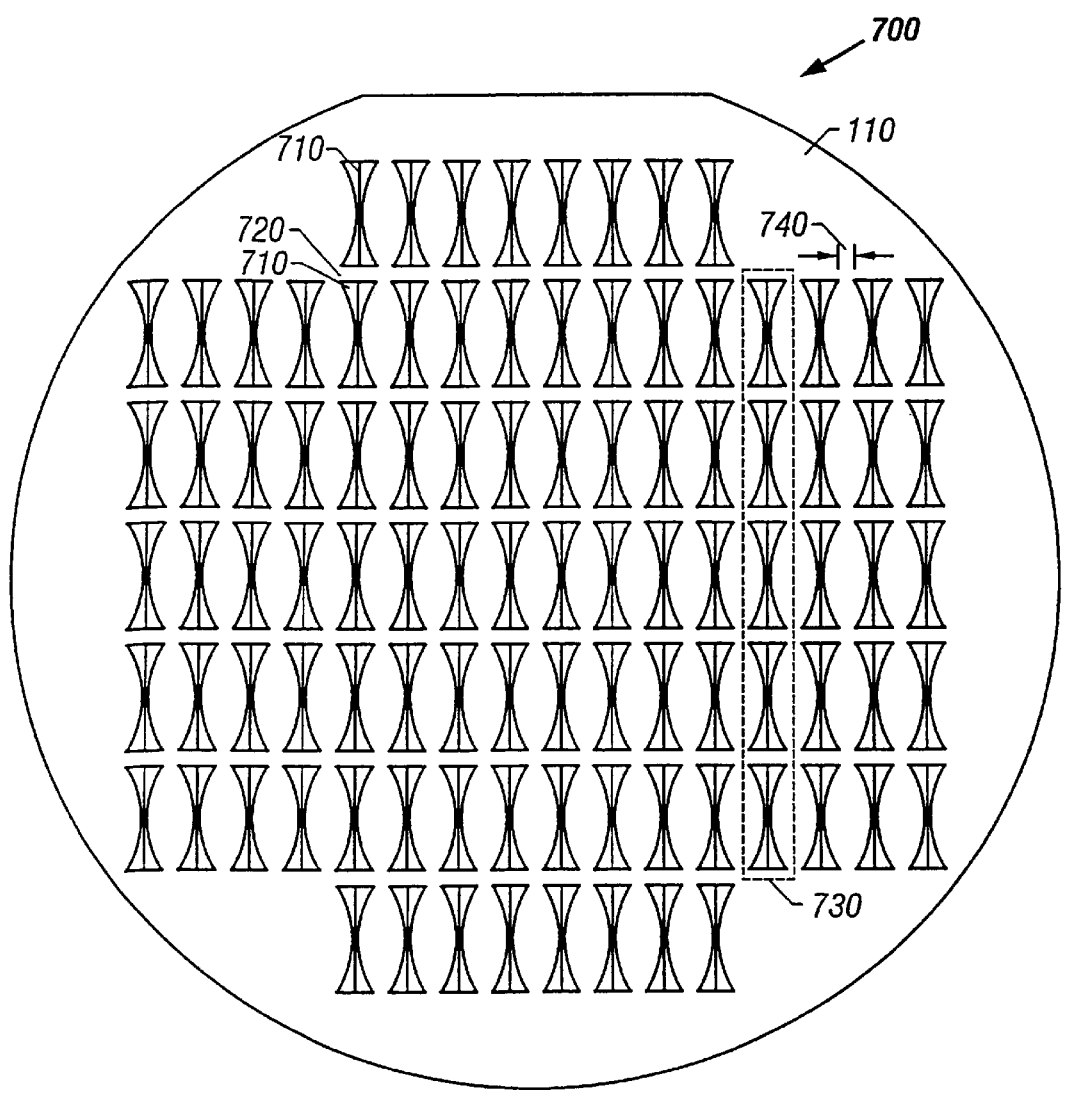
FIG. 7A shows a substrate that is fabricated with an array of grooves with openings.
Figure 7B:
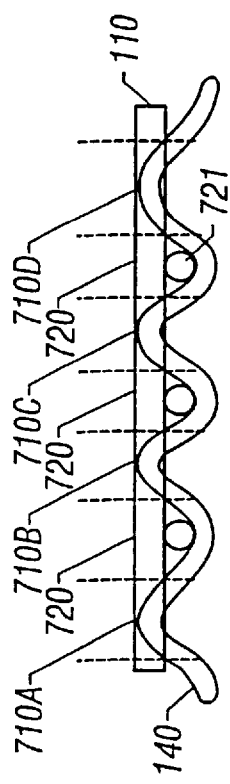
FIG. 7B shows a fiber device formed on a substrate with two or more grooves aligned with each other along a straight line on a single side of the substrate.

FIGS. 7A and 7B show that an array 700 of such V grooves 710 with two openings can be formed on one side of the substrate 110. The V grooves 710 may be aligned to be parallel to one another along their elongated directions and are arranged to form multiple parallel columns 730 with a spacing 740. Within each column 730, multiple V grooves 710 may be spaced from one another by a spacing 720. The substrate 110 with the array 700 may diced into multiple units each having one or more V grooves 710. Such units can be used to form various fiber devices. Hence, a batch fabrication process may be used to process the substrate 110 and to simultaneously form multiple fiber devices with V grooves 710.

A single fiber can be threaded through different V grooves 710 in a column 730 between the surfaces 112 and 114 via the openings 131 and 132. FIG. 7B shows an example where the fiber 140 is threaded through V grooves 710A, 710B, 710C, and 710D formed along a straight line on the surface 112 of the substrate 110. A spacer 721, such as a rod, may be optionally positioned on the surface 114 between the openings of two adjacent V grooves to provide a support to the fiber 140. Such support may be used to reduce sharp bending of the fiber 140 which may damage the fiber 140. After bonding and polishing the fiber 140, a coupling port is formed at each V groove on the surface 112 and is operable to couple optical energy out of or into the fiber 140. Therefore, this device has multiple coupling ports on the surface 112 to couple optical energy into or out of the fiber 140. When a proper control mechanism is implemented at each coupling port, optical switching, optical multiplexing, and other coupling operations may be achieved.

Figure 7C:
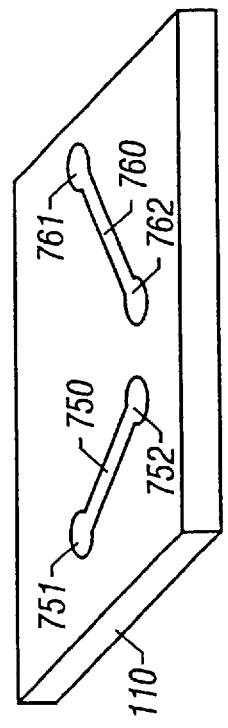
FIGS. 7C and 7D show fiber devices formed on a substrate with grooves on a single side of substrate that are oriented in different relative directions.
Figure 7D:
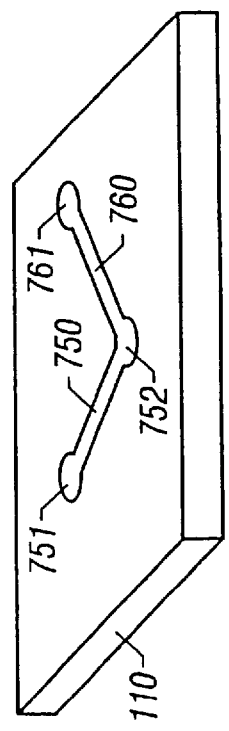

FIGS. 7C and 7D show additional embodiments of fiber devices that two different grooves 750 and 760 on the substrate 110 are not aligned along a straight line as in FIGS. 7A and 7B but form an angle with respect to each other. Numerals 751, 752, 761, and 762 indicate the openings of the grooves 750 and 760 that penetrate through the substrate 110. In FIG. 7C, the two grooves 750 and 760 are spaced from each other. A fiber may be placed in the grooves 750 and 760 by sequentially passing the fiber through the openings 761, 762, 752, and 751. In FIG. 7D, two grooves 750 and 760 are share a common opening 752. Such arrangements may be combined with aligned grooves.

Referring back to FIG. 1, the groove 120 with its two openings 131 and 132 may be formed on both sides 112 and 114 of the substrate 110 in the following manner. First, two adjacent grooves respectively formed in different sides of the substrate are aligned along the same groove direction. Second, the groove on one side shares an opening with the adjacent groove on the opposite side of the substrate 110. Techniques such as the double-sided photolithography may be used to form the V grooves on both surfaces of the substrate. Unlike the fiber device shown in FIG. 7B where the coupling ports are only on a single side of the substrate, a substrate with V grooves on both sides can form a fiber device with coupling ports on both sides of the substrate. Such double-sided coupling capability can provide flexible and versatile coupling configurations in various fiber devices.

Figure 8A:
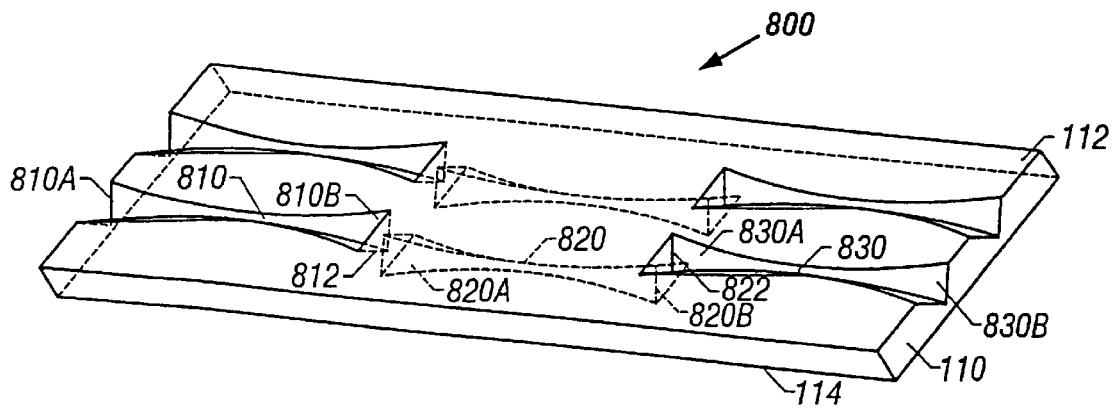
FIGS. 8A, 8B, 8C, 8D, and 9 illustrate substrates that are processed with grooves on both substrate surfaces.
Figure 8B:
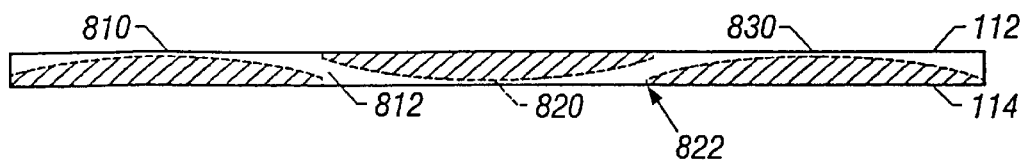
Figure 8C:
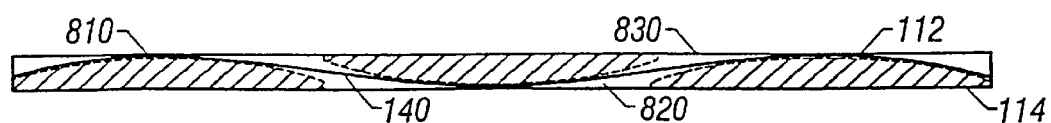

FIGS. 8A, 8B, and 8C illustrate one example of a fiber device 800 that has V grooves on both sides 112 and 114 of the substrate 110. A first V groove 820 is formed on the side 114. Similar to the V grooves in FIGS. 5B and 6, the depth and width of the V groove 820 increase from its center towards both ends 820A and 820B. A second, similar V groove 810 is formed on the opposite side 112 along the same groove direction. The end 810B of the second groove 810 overlaps with the end 820A of the first V groove 820 to create a through hole 812 that connects the V grooves 810 and 820. A third V groove 830 is also shown on the side 112 to have one end 830A overlap with the end 820B of the V groove 820 on the opposite side 114. A through hole 822 is then formed at the overlapping region to connect the V groove 820 to the V groove 830. A fiber 140 is shown in FIG. 8C to thread through the holes 812 and 822 to form coupling ports on both sides 112 and 114 of the substrate 110.

Figure 8D:
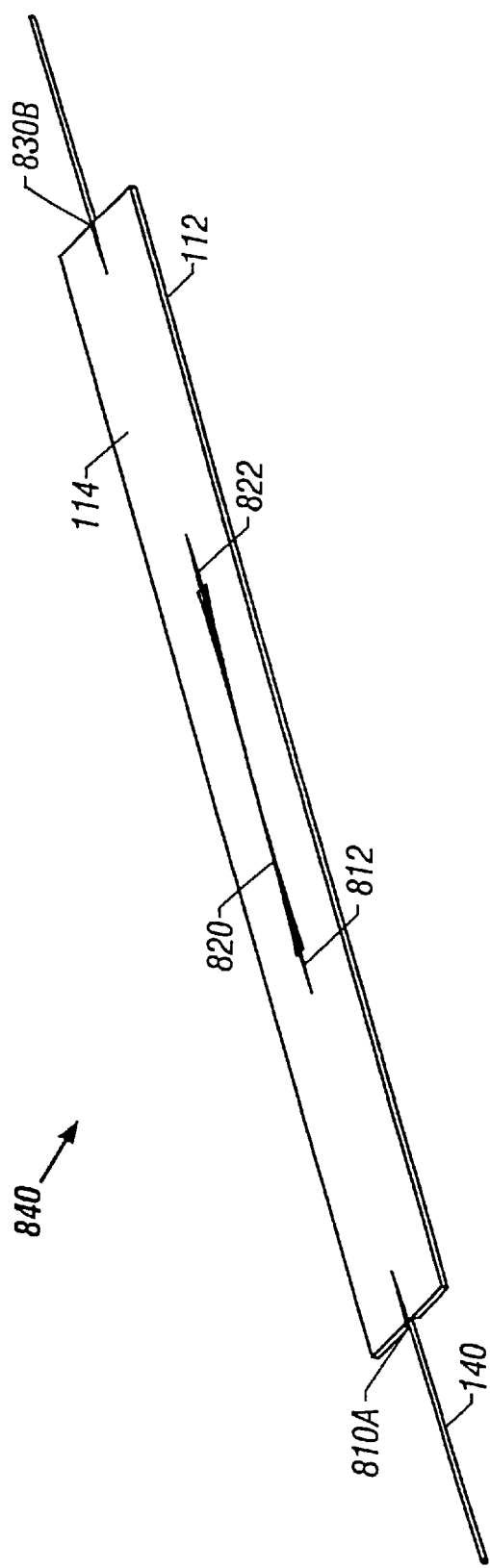
Figure 9:
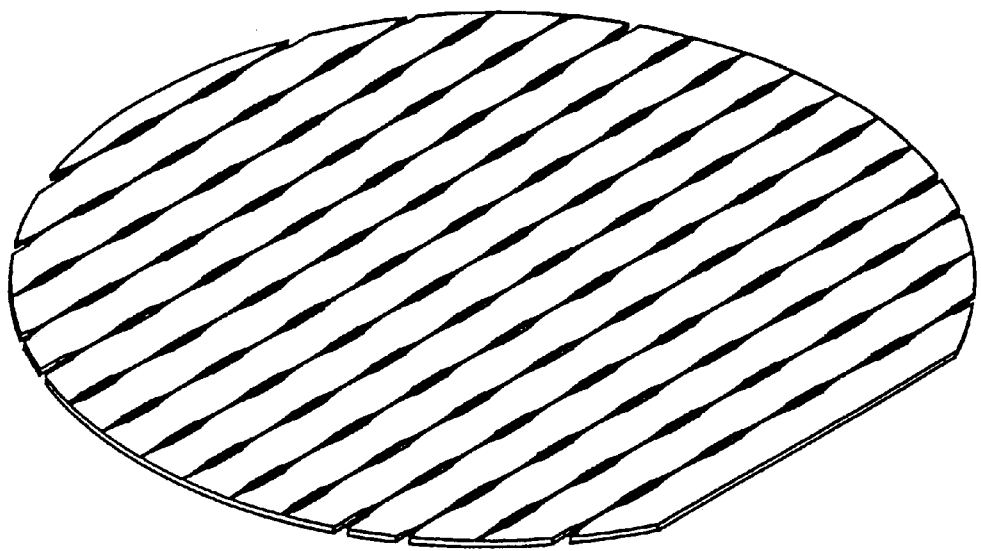

FIG. 8D shows a 3-port fiber device 840 that is formed by dicing a linear array of V grooves 810, 820, and 830 from the substrate 110. Comparing to the single-side device shown in FIG. 7B, the natural curvature of the V grooves formed on both sides eliminates the spacers 740. Similar to the batch fabrication of the single-sided devices shown in FIG. 7A, multiple double-sided devices may also be simultaneously fabricated from a single-sided substrate as illustrated in FIG. 9.

In the above devices with V grooves formed on both sides of the substrate, two adjacent V grooves, located on opposite sides of the substrate, may not be aligned along a straight line but form an angle with each other as illustrated by the adjacent grooves formed on the same side shown in FIGS. 7C and 7D. Similar to the grooves in FIGS. 7A and 7B, two adjacent V grooves, located on opposite sides of the substrate, may also be designed to spatially separate from each other without sharing a common opening that penetrates through the substrate and extends between two sides of the substrate.

The openings in the above examples of V grooves are formed by anistropically etching for forming the V grooves. Hence, there is no need to use a separate process to fabricate the openings if the etching mask is properly designed. However, a separate fabrication step may also be used to form an opening and to achieve any desired geometric shape of the opening that may be difficult or impossible to make through etching the V grooves.

Figure 10:
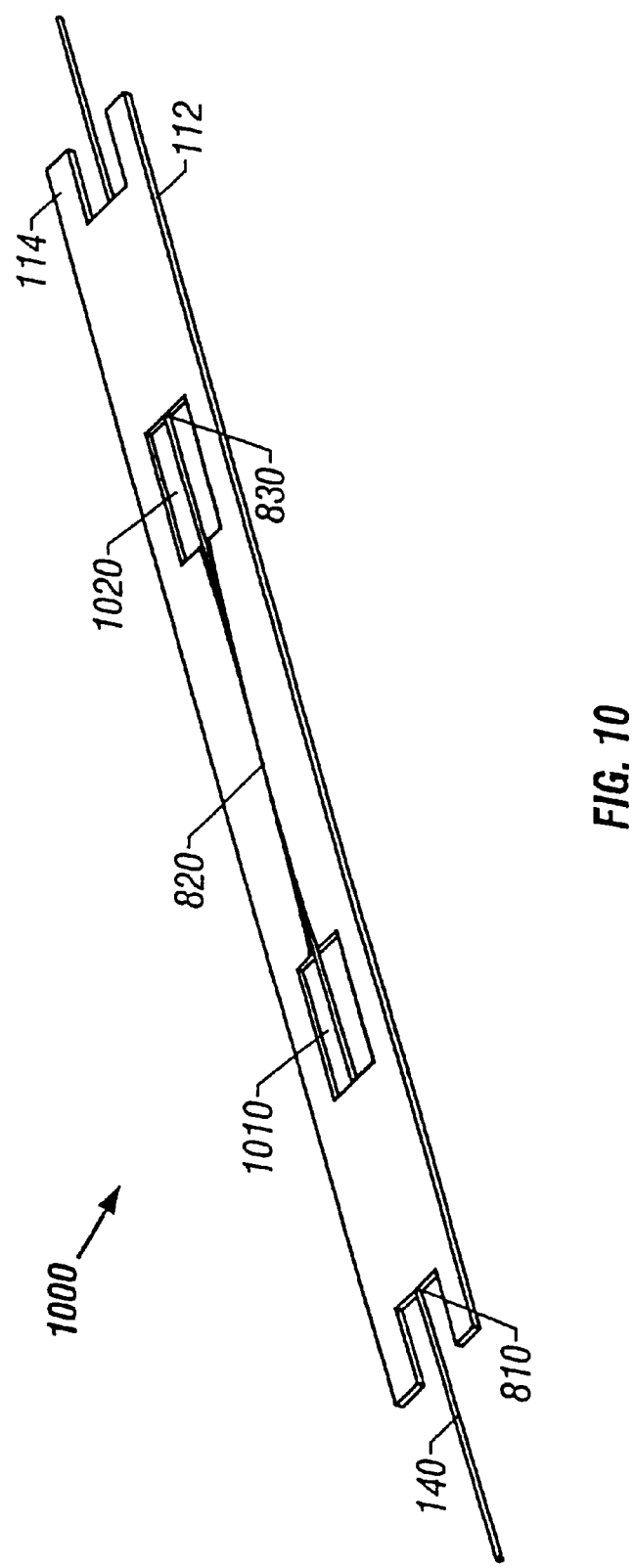
FIG. 10 shows a substrate processed with grooves on both substrate surfaces, where openings at both ends of each groove are separately fabricated from the V grooves.

FIG. 10 illustrates a fiber device 1000 with aligned V grooves 810, 820, and 830 on both sides 112 and 114 of the substrate 110 that are spaced from one another by rectangular openings 1010 and 1020. V grooves 810 and 830 are formed on the side 114 and the groove 820 is formed on the opposite surface 112 but is located between the grooves 810 and 830. An etching process separate from etching of the V grooves is needed to form such openings 1010 and 1020. Other processing techniques such as laser machining may also be used to form the openings.

The above fiber devices with V grooves either on one side or two sides may be used to form various fiber devices. Some exemplary devices are described below.

Figure 11:
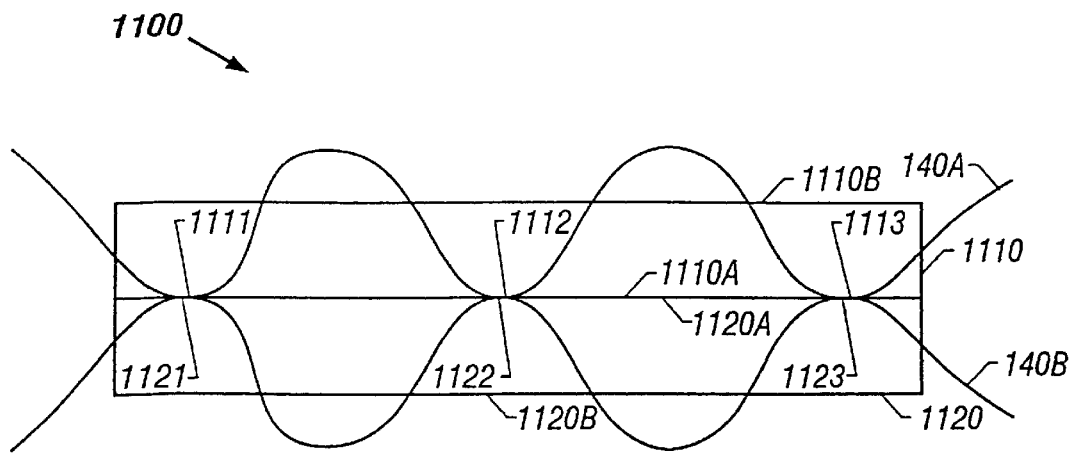
FIGS. 11 and 12 show exemplary fiber devices by integrating fibers to substrates with grooves.

FIG. 11 shows an optical fiber coupler 1100 by using two substrates 1110 and 1120 each with V grooves on a single surface of the substrate. The substrate 1110 has a surface 1110A on which three V grooves are fabricated and a fiber 140A is placed therein to form three coupling ports 1111, 1112, and 1113. Similarly, the substrate 1120 has a surface 1120A on which three V grooves are fabricated and a fiber 140B is placed therein to form three coupling ports 1121, 1122, and 1123. The two substrates 1110 and 1120 are engaged by having the surfaces 1110A and 1120A to face each other. The ports on one substrate substantially overlap with the coupling ports of another substrate to allow energy exchange between the fibers 140A and 140B. Various techniques may be used to engage the two substrates together, such as optical epoxy, glass frit thermal bond, CO2 laser assisted thermal bond.

A fiber device with V grooves on both sides of the substrate can be used to provide coupling on both sides. More coupling flexibility can be achieved in such a device than a device with grooves on only one side. For example, each fiber in the device 1100 shown in FIG. 11 cannot be accessed from the exposed surfaces 1110B and 1120B. Such access would be possible if one of the two substrates 1110 and 1120 were designed to have grooves on both sides. Thus, three or more substrates may be vertically stacked together to form a multi-layer optical coupler. Since each substrate may have two or more fibers, coupling among many fibers in different substrates may be achieved.

Figure 12:
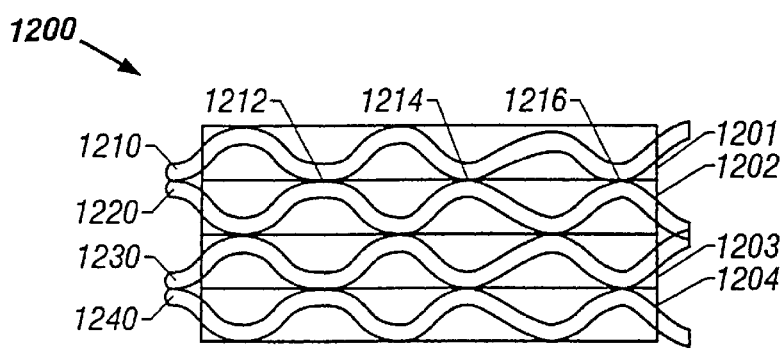

FIG. 12 shows a 4-layer optical multi-port coupler 1200 having 4 different double-sided substrates 1201, 1202, 1203, and 1204 based on the designs shown in FIGS. 8D or 10. Four different fibers 1210, 1220, 1230, and 1240 are respectively threaded in the substrates 1201, 1202, 1203, and 1204. Two adjacent substrates, such as 1201 and 1202, may be coupled to form the coupling ports 1212, 1214, and 1216. Hence, optical energy can be coupled between any two fibers. For example, an optical signal in the fiber 1210 may be coupled to the fiber 1230 by first coupling into the fiber 1220 and then coupling from the fiber 1220 into the fiber 1230. In general, a double-sided substrate can interface at both sides with other single-sided or double-sided substrates.

Figure 13A:
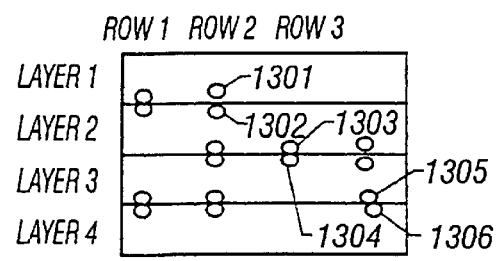
FIG. 13A shows uses of relative positions between grooves to control optical coupling between fibers positioned in the grooves.

FIG. 13A illustrates that optical coupling between two fibers in different layers may be controlled in a number of ways by controlling the relative position of the two fibers in grooves. For example, no optical coupling occurs between fibers 1301 and 1302 in the layers 1201 and 1202 when they are placed in deep grooves to have a separation much greater than one wavelength of the light. The fibers 1303 and 1304 in the layers 1202 and 1203 are positioned in shallow grooves so that a portion of each fiber's cladding is removed to allow for optical coupling. The depth of the grooves for the fibers 1303 and 1304 can be controlled to control the coupling strength via evanescent fields. The fibers 1305 and 1306, also in shallow grooves, are spatially offset in the lateral direction so that the optical coupling is reduced with the amount of the offset.

The grooves for holding fibers 1301 and 1302 are "deep" grooves in that the depth of the groove is greater than the diameter of the fiber so that the fiber cladding in the fiber portion in such grooves is not exposed above the substrate surface and no optical coupling port is formed. The grooves for holding the fibers 1303, 1304, 1305, and 1306, on the other hand, are "shallow" grooves as the groove 120 described with reference to FIG. 1 where a portion of a part of the fiber cladding protrudes above the substrate surface when the fiber is placed in such a groove and can be removed to form an optical coupling port 144. Such deep and shallow grooves may be combined to provide flexibility and versatility in routing fibers and arranging optical coupling ports in a fiber device.

Figure 13B:
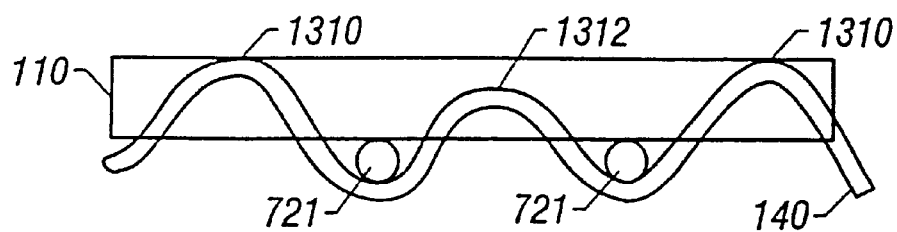
FIGS. 13B shows a substrate with both deep and shallow grooves formed on a single side.
Figure 13C:
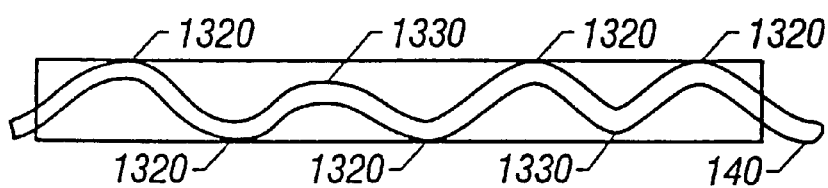
FIG. 13C shows a substrate with both deep and shallow grooves formed on both sides.

FIG. 13B shows a single-sided substrate similar to the substrate in FIG. 7B but processed to have both deep grooves 1312 and shallow grooves 1310. Each deep grove 1312 is used at a location where optical coupling is undesirable. FIG. 13C shows a double-sided substrate with deep grooves 1330 and shallow grooves 1320.

Figure 14:
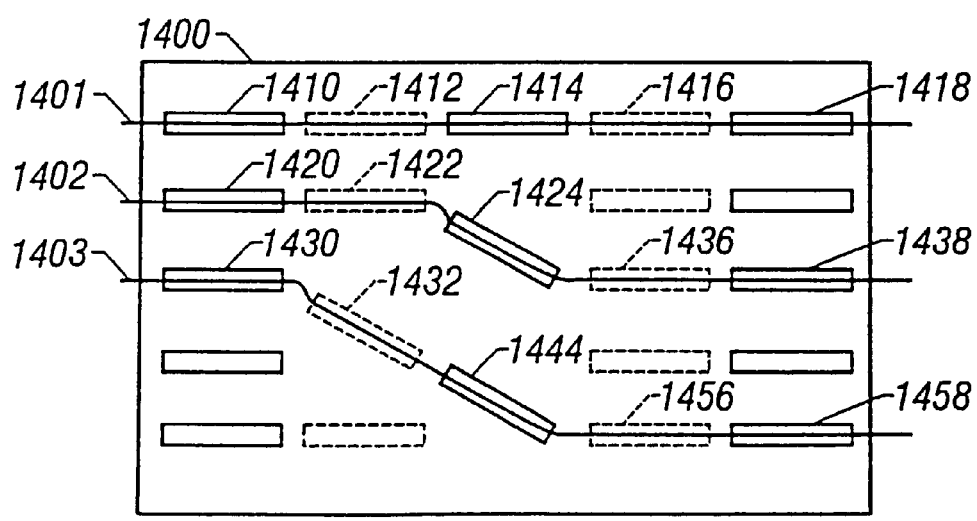
FIG. 14 shows an exemplary fiber device that has lateral jump-channel grooves on the substrate to change a direction of a fiber in the substrate plane.

FIG. 14 further shows that a lateral jump-channel groove 1424 on a substrate 1400 may be used to change the lateral direction of a fiber. The substrate 1400 is shown to have grooves on both sides. Solid elongated boxes such as 1410 represent grooves formed on one side and the dashed elongated boxes such as 1412 represent grooves formed on the other side. The grooves 1410, 1412, 1414, 1416, and 1418 are aligned with one another along a straight line to hold a fiber 1401. The groove 1424 is a lateral jump-channel groove that is oriented with an angle relative to adjacent grooves 1422 and 1436. Hence, a fiber 1402 can be threaded through the lateral jump-channel groove 1424 to run through grooves 1440 and 1422 and then to change its direction to run through grooves 1436 and 1438. Lateral jump-channel grooves 1432 and 1444 are also shown to direct the fiber 1402 from the groove 1430 to grooves 1456 and 1458. A single-side substrate with grooves on one side may also be designed to have such lateral jump-channel grooves.

Such a lateral jump-channel can be combined with the vertical integration of different double-side substrates to change the direction of an optical signal both laterally within a substrate and vertically from one substrate to another substrate. This opens up possibility similar to multi-layer printed circuit board technology allowing sophisticated connections from point to point and from layer to layer.

Figure 15:
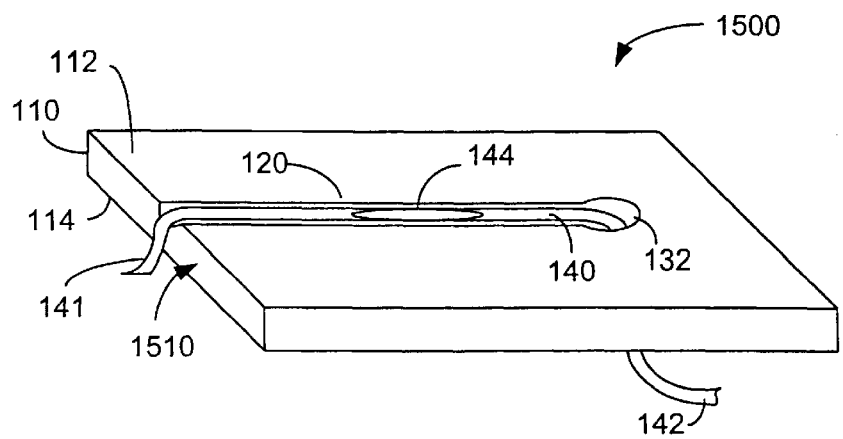
FIG. 15 shows a design to engage a side-polished fiber onto a substrate by using an elongated groove with a single through hole.

FIG. 1 shows the use of elongated groove 120 and two through holes 131 and 132 at the ends of the groove 120 to engage a fiber to the substrate 110 and to form each fiber coupling port 144. Alternatively, only one through hole 132 in the substrate 110 may be used to engage the fiber 140 to form a fiber coupling port 144. FIG. 15 shows an example of such a fiber structure 1500. The groove 120 may extend to one end side 1510 of the substrate 110 so that one end 141 of the fiber 140 leaves the groove 120 without going through a through hole.

Based on the above fiber structures, a variety of fiber devices may be constructed. The following describes several examples.

Figure 16:
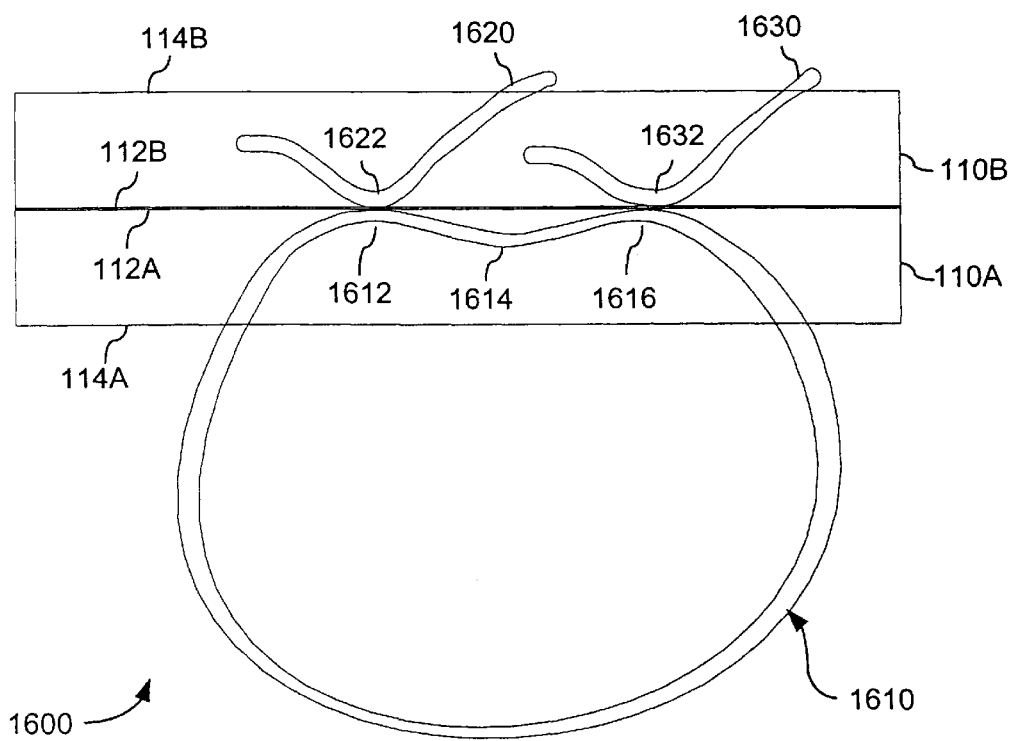
FIG. 16 shows one embodiment of a fiber ring resonator.

FIG. 16 shows a fiber ring resonator device 1600 having two optical I/O ports 1612 and 1616. A closed fiber ring 1610 is engaged to an elongated groove formed over a substrate surface 112A of a substrate 110A. The groove has at least three sections. A first section is a shallow groove section where a portion of the fiber cladding is removed and polished to form the first fiber coupling port 1612. A second section is a deep groove section where the fiber section 1614 is located below the substrate surface 112A. A third section is another shallow groove section where a portion of the fiber cladding of another fiber section is removed and polished to form the second fiber coupling port 1614. Either of the fiber coupling ports 1612 and 1616 may be used to extract energy out of the fiber ring 1610 as an output port or inject optical energy into the fiber ring 1610 as an input port. In a typical application, one port may be used as the input port and the other port may be used as the output port.

The fiber ring resonator device 1600 is designed to include a second substrate 110B that has its substrate surface 112B to interface with the substrate surface 112A of the substrate 110A. Two elongated grooves are fabricated on the surface 112B for receiving two separate fibers 1620 and 1630. Each elongated groove on the substrate surface 112B has a shallow section to form at least one fiber coupling port in the respective fiber 1620 or 1630. Hence, two fiber coupling ports 1622 and 1632 are respectively formed in fibers 1620 and 1630 and are spaced from each other with the same spacing between the fiber coupling ports 1612 and 1616 in the fiber ring 1610. The two substrate surfaces 112A and 112B are aligned to overlap the fiber coupling port 1622 with the fiber coupling port 1612 for evanescent coupling, and the fiber coupling port 1632 with the fiber coupling port 1616 for evanescent coupling. The two substrates 110A and 110B may be engaged in this position by using, among other techniques, an adhesive (e.g., epoxy), glass frit thermal bond, or CO2-laser assisted thermal bond. The joint ports formed by the fiber coupling ports 1512A and 1522A, and by the fiber coupling ports 1512B and 1522B may be 3-dB directional couplers. In this configuration, the fiber ring 1610 is evanescently coupled at two different locations to the fibers 1620 and 1630, respectively. Hence, the fiber 1620 may be used to carry an input optical signal and to inject it into the fiber ring 1610 while the fiber 1630 may be used to extract optical energy out of the fiber ring 1610 and to carry the output optical signal.

The fiber ring resonator device 1600 may be used in various applications. For example, at least a section of the fiber ring 1610 may be doped with active ions to produce optical gain at a selected wavelength or a spectral range so that the device 1600 may operate as an optical amplifier or a ring laser. An optical pump beam may be used to supply the optical pump energy into the fiber ring 1610. This may be done by using a separate optical coupler engaged to the ring 1610. Alternatively, the fiber ring 1610 may be designed to have only one coupling port 1612 and the substrate 110B may only has one fiber 1620.

Figure 17A:
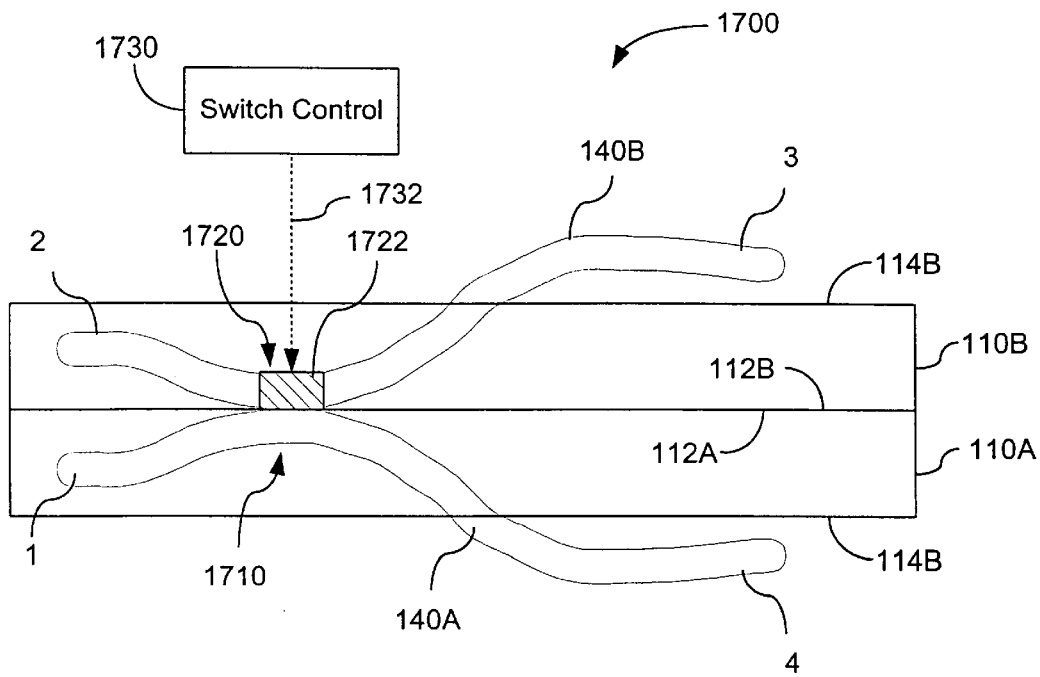
FIGS. 17A, 17B, 18, and 19 show exemplary adjustable optical switches.
Figure 17B:
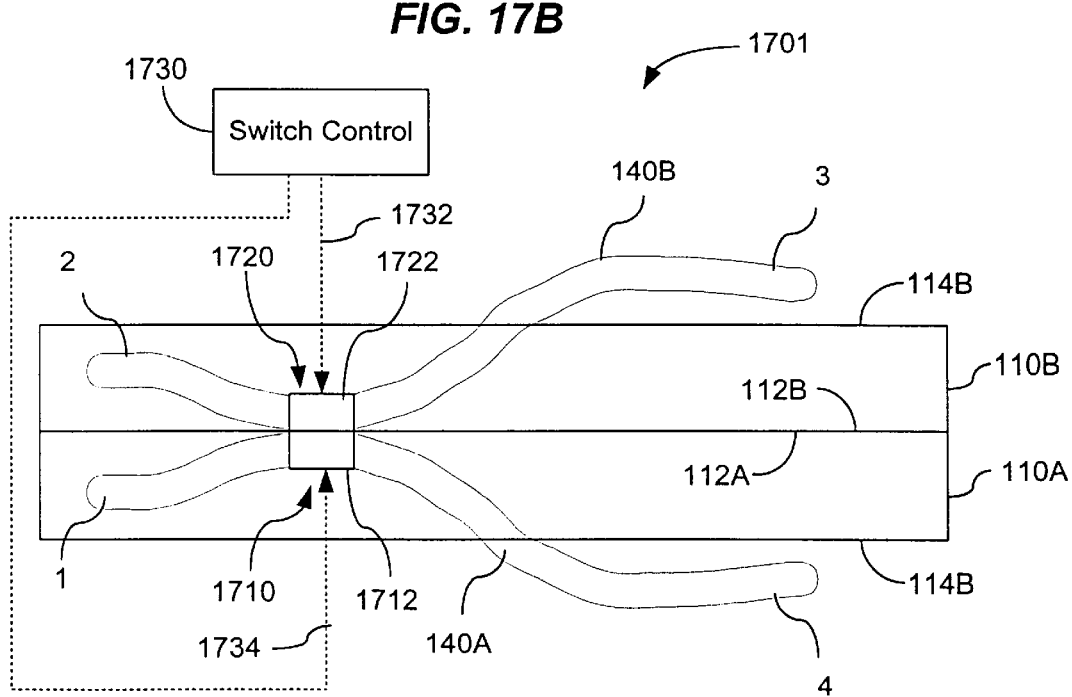

FIGS. 17A and 17B show two exemplary optical switches 1700 and 1701 that are formed by engaging two fibers 140A and 140B to each other through their respective fiber coupling ports 1710 and 1720. The fibers 140A and 140B are respectively engaged to grooves in substrates 110A and 110B to form the fiber coupling ports 1710 and 1720, respectively. Each fiber coupling port has a desired length Lc as illustrated in FIG. 2A. The two substrates 110A and 110B are coupled so that the fiber coupling ports 1710 and 1720 face each other to allow evanescent coupling between the fibers 140A and 140B over the length Lc. Effectively, this configuration forms a fiber directional coupler with two input ports 1 and 2 and two output ports 3 and 4 as shown.

Notably, the fiber section in the coupling port 1720 of the fiber 140B is an adjustable section 1722 whose optical path length can be changed in response to a control signal 1732. Hence, the effective coupling length between the fiber coupling ports 1710 and 1720 can be varied and controlled. An optical signal at an input wavelength received by either one of the input ports 1 and 2 can be coupled to either one of the output ports 3 and 4 based on this effective coupling length. For example, the control signal 1732 may be set at a first value, where the input optical signal received by the fiber 140B at the input port 2 stays in the fiber 140B after propagating through the coupling section and exits at the port 3. The control signal 1732 may be set to a second value to couple the input signal into the fiber 140A to exit at the port 4. Under such a control, the directional coupler operates as an optical switch. A switch control unit 1730 may be implemented to produce and adjust the control signal 1732. In a WDM applications, this switch may be used to switch all even-numbered channels to one output port while sending all odd-numbered channels to the other output port. When the phase change for a change in wavelength by one spectral spacing between two adjacent channels is 180 degrees.

The above adjustable section 1722 may be realized in a number of ways. For example, a thermal heating element as a thermal phase shifter (e.g., a thin-film heater), may be coupled to the fiber coupling port 1720 to form the section 1722 so that the refractive index (and the length) can be controlled by controlling the local temperature. Also, the section 1722 may be designed to exhibit the electro-optic effect so that an external electrical field may be applied as the control signal 1732 to change its refractive index. In addition, the section 1722 may be photosensitive and the control signal 1732 may be an optical beam.

FIG. 17B shows a modified switch 1702 where a second adjustable section 1712 is formed in the fiber coupling port 1710 in the fiber 140A. This design may be used to increase the switching sensitivity. The control unit 1730 may be used to produce a separate control signal 1734 for controlling the section 1712.

Figure 18:
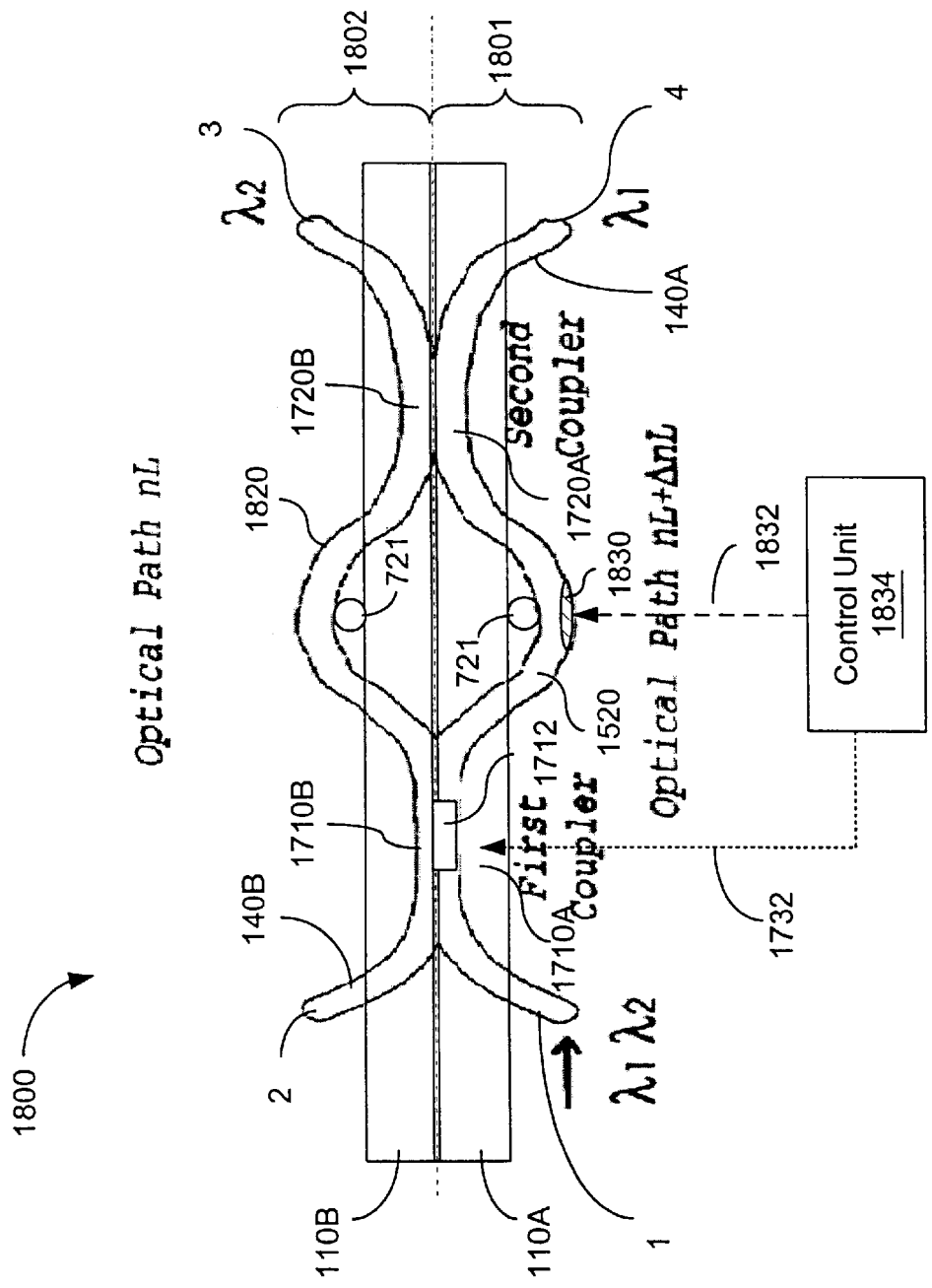

An optical switch may also be formed from a Mach-Zehnder interferometer. FIG. 18 shows one such optical switch 1800 that engages two fiber modules 1801 and 1802 with fibers 140A and 140B on substrates 110A and 110B, respectively. The Mach-Zehnder interferometer may be generally formed by having two separate optical paths joined to each other at two separate joints. Each optical path may be a fiber 140A or 140B. One joint may be used as an input port at which an input optical signal originally in either one optical path is received and split into two equal optical signals separately in the two optical paths. Accordingly, the other joint at the opposite sides of the optical paths may be used as the output port at which the two optical signals, after propagating through the two separate optical paths, are combined to interfere with each other. Each of the input and output joints can be formed by overlapping the two optical paths over a region with a desired coupling length to allow for energy coupling therebetween. Hence, each joint is essentially a 3-dB directional coupler and the coupling length in the overlapped region is selected to produce a relative phase shift of $\pi/2$ for an optical signal at a wavelength that is to be equally divided in the two optical paths. Hence, the total phase shift at each output optical path after the output port is a sum of the phase shift at the input joint port, the phase shift between the two optical paths between the input and output joint ports, and the phase shift at the output joint port. The phase shift between the two optical paths is determined by the optical path lengths, i.e., the refractive index multiplied by the physical length, of the two optical paths. Depending on whether the phase difference between the two optical paths between the input and output ports is $2N\pi$ or $(2N+1)\pi$, where N=0, ±1, ±2, etc., the interference can make an input signal from one optical path to either stay in the same optical path at the output or switch to the other optical path at the output.

In the optical switch 1800 in FIG. 18, two fibers 140A and 140B are integrated or engaged onto two separate substrates 110A and 110B, respectively. Each fiber has two adjacent coupling ports, 1710A and 1720A in fiber 140A and 1710B and 1720B in fiber 140B, to couple with respective coupling ports in another fiber and to form the two joint ports of the Mach-Zehnder interferometer. A fiber segment 1810 between fiber coupling ports 1710A and 1720A in the fiber 140A and a fiber segment 1820 between fiber coupling ports 1710B and 1720B in the fiber 140A for the two optical paths for the Mach-Zehnder interferometer. The optical path lengths of the fiber segments 1810 and 1820 in fibers 140A and 140B are generally different so that a proper relative phase shift between the signals in the two fibers 140A and 140B can be obtained to couple one or more desired WDM channels from one fiber (e.g., the fiber 140B) to the other fiber (e.g., the fiber 140A) while other WDM channels remain in the original fiber (e.g., the fiber 140B).

Two separate adjustable fiber sections 1710 and 1830 are implemented in the optical switch 1800. The adjustable fiber section 1710 is located in the fiber coupling port 1710A of the fiber 140A to change the optical path length in response to the control signal 1732. The adjustable fiber section 1830 is located in the fiber segment 1810 to create an adjustable difference in the optical path lengths of the two fiber segments 1810 and 1820 in response to another control signal 1832. The combination of these two adjustable fiber sections 1710 and 1830 operates to change the overall phase shift between the two optical paths. Hence, different wavelengths received in one fiber prior to the joint port formed by ports 1710A and 1710B may be selected, in accordance with control signals 1732 and 1832, to couple to the other fiber after the joint port formed by ports 1720A and 1720B. Each adjustable section may be implemented as a mechanism to change the physical length or the index, or a combination of both. The index change may be a change in the index of the fiber core, or the index of the fiber cladding, or a combination of both. A control unit 1730 is provided to generate and adjust the control signals 1732 and 1832.

Figure 19:
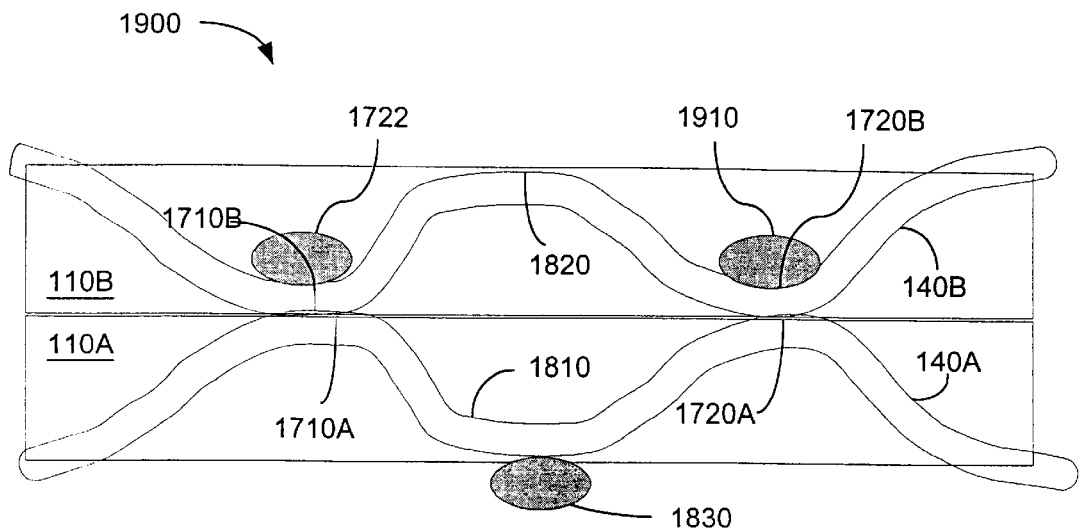

FIG. 19 shows another Mach-Zehnder-based optical switch where adjustable fiber sections 1722 and 1910 are formed at the input and output joints and the adjustable fiber section 1830 at least one of the fiber segments 1810 or 1802. In yet another variation, both fiber segments 1810 and 1820 may be made adjustable.

Figure 20:
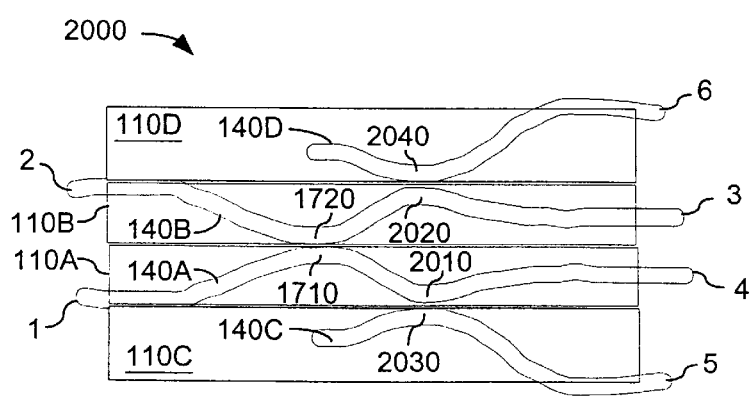
FIGS. 20 and 21 show exemplary optical splitters.

FIG. 20 shows a 1×4 optical splitter 2000 based on the above fiber structures. Two double-sided substrates 110A and 110B are fabricated to have elongated grooves on both substrate surfaces. A fiber 140A has one portion laid in a groove on one substrate surface 112A to form a fiber coupling port 1710 and another portion laid in a groove on the opposite substrate surface 114A to form a second fiber coupling port 2010. The fiber 140B engaged to the double-sided substrate 110B is similarly designed to have two fiber coupling ports 1720 and 2020 on opposing substrate surfaces. Two additional substrates 110C and 110D, either single-sided or double-sided, are used to engage fibers 140C and 140D to form two fiber coupling ports 2030 and 2040, respectively.

The substrates 110A, 110B, 110C, and 110D are stacked with substrates 110A and 110B in the center and sandwiched between substrates 110C and 110D. The fiber coupling ports 1710 and 1720 are aligned to face each other to provide evanescent coupling between the fibers 140A and 140B. The fiber coupling port 2030 of the fiber 140C is aligned to face the coupling port 2010 of the fiber 140A to provide evanescent coupling between the fibers 140A and 140C. In addition, the fiber coupling port 2040 of the fiber 140D is aligned to face the coupling port 2020 of the fiber 140B to provide evanescent coupling between the fibers 140B and 140C. Hence, each of the three pairs of fiber coupling ports is a directional coupler and is designed to couple a portion of the optical signal received in one fiber to another fiber. Hence, a signal received by the fiber 140A from the fiber input terminal 1 is in part coupled into the fiber 140B at the coupling port between the ports 1710 and 1720 and in part remains in the original fiber 140A. The signal in the fiber 140B is further divided between the fibers 140B and 140D through the coupling between the fiber ports 2040 and 2020. Similarly, the signal in the fiber 140A is further divided between fibers 140A and 140C through the coupling between the fiber ports 2010 and 2030. As a result, the original optical signal at the fiber port 1 is split into four optical signals output at fiber output terminals 3, 4, 5, and 6 as shown.

The coupling ratios at different pairs of fiber coupling ports may be equal or different depending on the applications. If all coupling ratios are equal and are 3 dB, the optical energy is equally divided between two coupling fibers at each coupling location. As a result, the divided output signals at four output terminals 3, 4, 5, and 6 are equal in strength.

Figure 21:
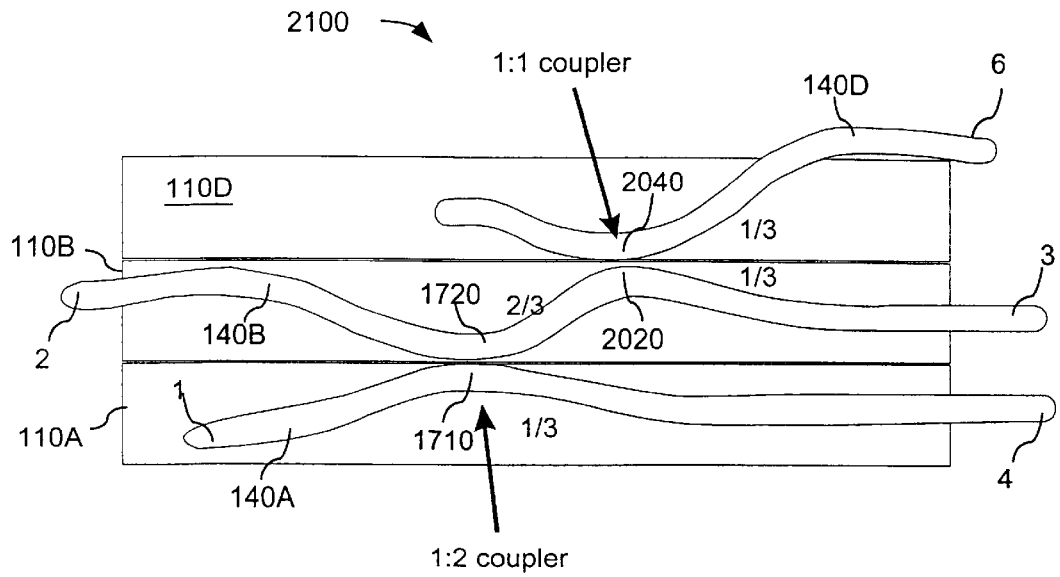

FIG. 21 shows a 1×3 fiber splitter 2100 with three stacked substrates 110A, 110B, and 110D, where the center substrate 110B is a double-sided substrate as in FIG. 20. The substrates 110B and 110D may be either single-sided or double-sided. The coupling ratio between the fiber ports 1710 and 1720 is 1:2 while the coupling ratio between the fiber ports 2020 and 2040 is 1:1 (3 dB). This configuration equally splits an optical signal received at the fiber terminal 1 into three equal parts at output terminals 3, 4, and 6.

Other combinations of coupling ratios may certainly be used to split an input into different output signals with different output amplitudes. It is contemplated that, each of the fiber splitters 2000 in FIG. 20 and 2100 in FIG. 21 may be stacked with other fiber splitters if the substrate at the outer side of each fiber splitter is double sided. Based on the designs in FIGS. 20 and 21, a simpler splitter is a 1×2 splitter which can be formed with the structure 2100 in FIG. 21 by removing the substrate 110D and the respective fiber 140D. Hence, any input signal from either port 1 or 2 can be split into two output signals at ports 3 and 4.

In addition, the above 1×2, 1×3, and 1×4 optical splitters and any other optical devices based on such may certainly be made adjustable by implementing adjustable fiber sections at the coupling ports as in the devices shown in FIGS. 17A, 17B, 18, and 19. This adjustable mechanism can be used to adjust the coupling ratio at a selected coupling port according to a control signal.

Figure 22:
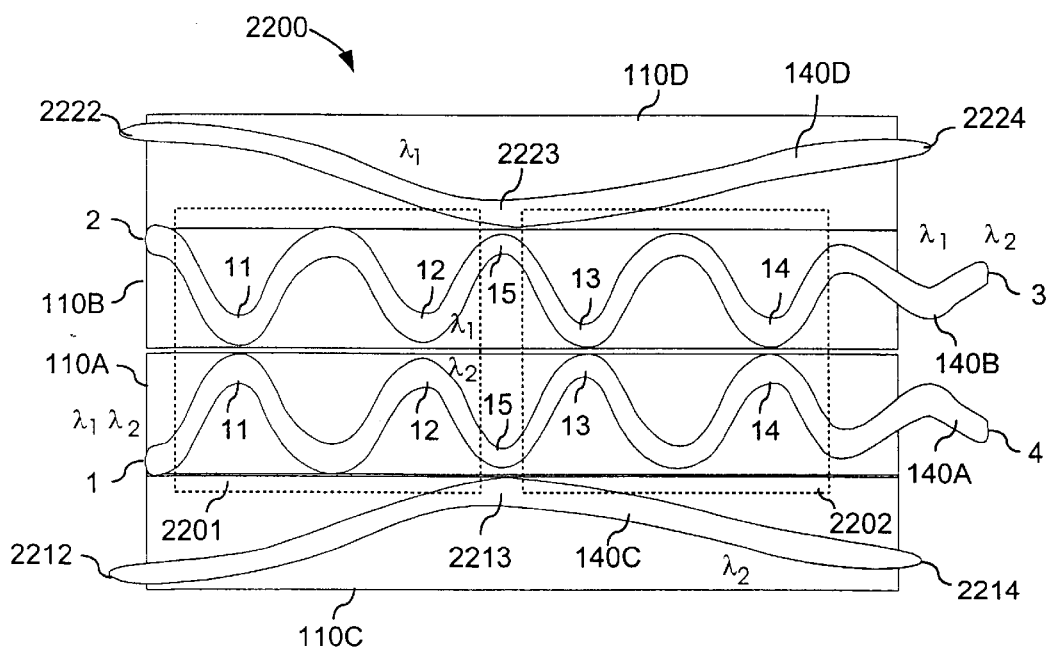
FIGS. 22 and 23 show exemplary optical WDM add/drop devices.

FIG. 22 shows one embodiment of a WDM add/drop device 2200 by stacking four substrates 110A, 110B, 110C, and 110D with four fibers 140A, 140B, 140C, and 140D, respectively. Substrates 110A and 110B are double-sided substrates where fibers 140A and 140B are engaged to grooves on both substrate surfaces to form fiber coupling ports 11–15. Each of the fibers 140A and 140B has at least five fiber coupling ports 11–15 arranged as shown, where four ports 11–14 are located on the same substrate surface and one port 15 is located on the opposite substrate surface between ports 11, 12, and 13, 14. Fibers 140A and 140B are interfaced with each other to form two Mach-Zehnder interferometers 2201 and 2202 with their ports 11, 12, 13, and 14. The fiber ports 15 are located between the two Mach-Zehnder interferometers 2201 and 2202 to operate as add or drop ports. The substrates 140C and 140D may be either single sided or double sided and fibers 140C and 140D are fabricated to have fiber coupling ports 2213 and 2223, respectively. The fiber coupling ports 2213 and 2223 are respectively coupled to the fiber coupling ports 15 of the fibers 140A and 140B. In particular, the coupling between the port 15 of the fiber 140B and the port 2223 of the fiber 140D is designed to couple only optical energy at a selected wavelength $\lambda 1$, while the coupling between the port 15 of the fiber 140A and the port 2213 of the fiber 140C is designed to couple only optical energy at a selected wavelength $\lambda 2$. Fiber terminals 1 and 2 of the fibers 140A and 140B are used as the input terminals and the corresponding opposite terminals 4 and 3 are used as the output terminals. Accordingly, fiber terminals 2212 and 2222 of the fibers 140C and 140D are used as input add terminals and corresponding fiber terminals 2214 and 2224 are used as output drop terminals.

The first Mach-Zehnder interferometer 2201 is configured as a WDM demultiplexer which separates one or more selected WDM channels received in one fiber terminal 1 of fiber 140A or 2 of fiber 140B into another fiber 140B or 140A while other unselected WDM channels remain the in received fiber. The second Mach-Zehnder interferometer 2202 is configured as a WDM multiplexer which combines different WDM channels respectively received by fibers 140A and 140B as the output at either the output terminal 3 of the fiber 140B or the output terminal 4 of the fiber 140A.

FIG. 22 further illustrates the operation of the device 2200 in a two-channel example. Two WDM channels at different wavelengths $\lambda 1$ and $\lambda 2$ are received at the fiber input terminal 1 of the fiber 140A. The first Mach-Zehnder interferometer 2201 operates to send the first channel $\lambda 1$ to the fiber 140B while keeping the second channel $\lambda 2$ in the fiber 140A at its output. The first channel $\lambda 1$ is then received by the fiber coupling port 15 is coupled to the fiber coupling port 2223 of the fiber 140D via evanescent coupling. Hence, the channel at $\lambda 1$ is dropped at the terminal 2224. If the terminal 2222 does not receive a new channel at the same wavelength $\lambda 1$, the output at either of the terminals 3 and 4 will not have a channel at $\lambda 1$. If the terminal 2222 does receive a new channel at the same wavelength $\lambda 1$, the new channel is then coupled into the fiber 140B at the port 15 and is then combined with other channels to be output at either of the terminals 3 and 4. The coupling at the port 15 of the fiber 140A operates similarly to drop or add a channel at the wavelength $\lambda 2$. In the illustrated operation, the second Mach-Zehnder interferometer 2202 is configured to combine different channels into the output terminal 3 in the fiber 140B.

This device 2200 may certainly be adjustable by implementing adjustable fiber sections at the coupling ports 11–15 as in the devices shown in FIGS. 17A, 17B, 18, and 19. Hence, either or both of the Mach-Zehnder interferometers 2201 and 2202 may be adjusted to change their operations on one or more wavelengths. In addition, the coupling ports 15, 2213, and 2223 may also be made adjustable to change their respectively wavelengths to be coupled. For example, the Mach-Zehnder interferometers 2201 may be adjusted to send $\lambda 2$ to fiber 140B while keeping $\lambda 1$ in the fiber 140A while the coupling between the ports 15 and 2223 is adjusted to couple light at $\lambda 2$ and the coupling between the ports 15 and 2213 is adjusted to couple light at $\lambda 1$. Hence the adjustable fiber sections provide dynamic and reconfigurable operations.

Figure 23:
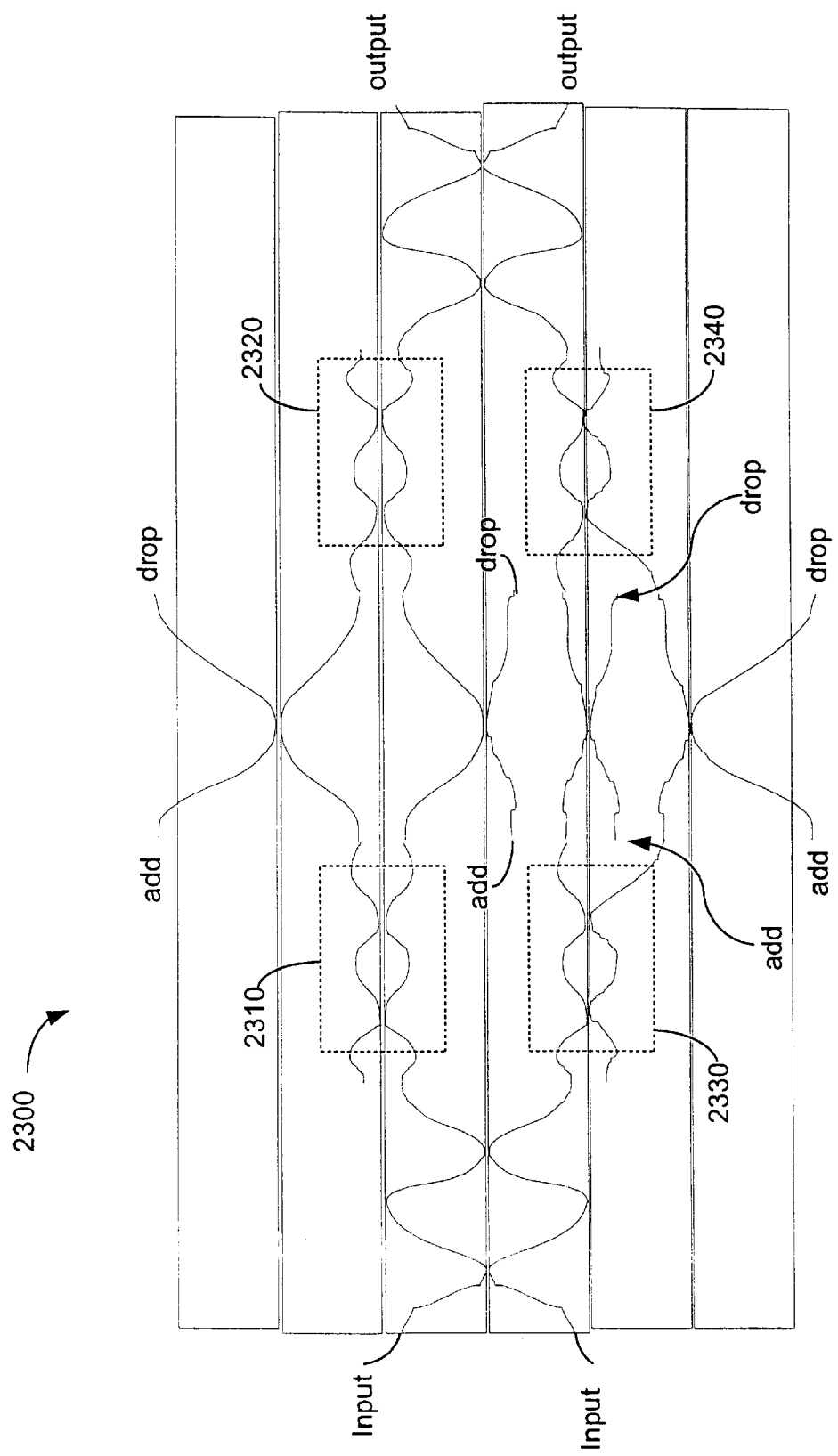

The device 220 is essentially a 2×2 add/drop device. The design principle, however, may be extended to devices with expanded add/drop capacities. FIG. 23 shows a 4×4 device 2300 by stacking up to six layers of substrates. The four substrates in the middle are double sided to allow for optical coupling on both substrate surfaces. Four Mach-Zehnder interferometers 2310, 2320, 2330, and 2340 are formed as WDM multiplexers or demultiplexers for direct different wavelengths to proper fibers. The fiber terminals for adding channels are indicated by "add" and the fiber terminals for dropping channels are indicated by "drop." Adjustable fiber sections may also be implemented to make the device 2300 reconfigurable when needed.

In the above devices, at least one buffer layer of a suitable material such as a dielectric material like silicon dioxide or silicon nitride may be formed over a groove under the fiber. This buffer layer may be designed to have certain mechanical or thermal properties to stabilize the structure formed by the substrate, the buffer layer, and the fiber by reducing the mechanical or thermal stress between the silicon substrate and the glass fiber. Therefore the reliability of the device can be improved. For example, if the substrate is formed of silicon, a dielectric material with a coefficient of thermal expansion (CTE) between the CTE values of the silicon and the glass fiber may be used as the buffer. Two or more buffer layers may also be used to achieve desired stabilizing effects.

Only a few embodiments are disclosed. However, it is understood that variations and enhancements may be made without departing from the spirit of and are intended to be encompassed by the following claims.

What is claimed is:

1. A device, comprising:
   a substrate having first and second opposing substrate surfaces;
   a first elongated groove formed over said first substrate surface, and first and second openings respectively formed at two ends of said first elongated groove, each opening penetrating through said substrate to extend between said first and second substrate surfaces;
   an optical fiber engaged to said substrate by passing through said first and second openings and having at least first, second, and third contiguous fiber portions, wherein said second fiber portion is disposed in said first elongated groove on said first substrate surface, and said first and said third fiber portions located on or over said second substrate surface;
   a second elongated groove formed on said second substrate surface and positioned to have one end overlapping with one of said first and said second openings to receive said third fiber portion, said second elongated groove having another opening at another end of said second elongated groove to pass a fourth fiber portion adjacent to said third fiber portion through said substrate to be on or over said first substrate surface; and
   a third elongated groove formed on said first substrate surface and positioned to have one end overlap said another opening of said second elongated groove to receive said fourth fiber portion,
   wherein said second fiber portion has a section where fiber cladding is partially removed to form a first optical coupling surface which evanescently couples optical energy into or out of a core of said optical fiber.

2. The device as in claim 1, wherein said second fiber portion and said fourth fiber portion are bonded to said first elongated groove and said third elongated groove, respectively.

3. The device as in claim 1, wherein said first elongated groove has a V-shaped cross section.

4. The device as in claim 1, wherein said first elongated groove has a U-shaped cross section.

5. The device as in claim 1, wherein said first elongated groove has a rectangular cross section.

6. The device as in claim 1, wherein said first elongated groove has a cross section forms at least a part of a circle.

7. The device as in claim 1, wherein said first elongated groove has a depth that increases from a center between said first and said second openings towards said first and said second openings.

8. The device as in claim 1, wherein said second elongated groove is oriented along an elongated direction of said first elongated groove.

9. The device as in claim 1, wherein said second elongated groove is oriented to form a non-zero angle with respect to an elongated direction of said first elongated groove.

10. The device as in claim 1, wherein said third fiber portion includes an area where at least part of fiber cladding is removed to form a second optical coupling surface which evanescently couples optical energy into or out of a core of said optical fiber.

11. The device as in claim 10, wherein said fourth fiber portion has a section where fiber cladding is partially removed to form a third optical coupling surface which evanescently couples optical energy into or out of a core of said optical fiber.

12. The device as in claim 1, wherein said fourth fiber portion has a section where fiber cladding is partially removed to form a second optical coupling surface which evanescently couples optical energy into or out of a core of said optical fiber.

13. The device as in claim 1, further comprising a buffer layer formed between said groove and said optical fiber operable to reduce a mechanical or thermal stress between said optical fiber and said substrate.

14. The device as in claim 13, wherein said substrate if formed of silicon and said buffer layer is formed of silicon nitride or silicon dioxide.

15. A device, comprising:

a substrate having first and second opposing substrate surfaces;

a first elongated groove formed over said first substrate surface, and a first opening formed at one end of said first elongated groove to penetrate through said substrate by extending between said first and second substrate surfaces;

an optical fiber engaged to said substrate by passing through said first opening to have a first fiber portion disposed in said first elongated groove on said first substrate surface;

a first fiber coupling port formed in said first fiber portion by removing at least part of fiber cladding to evanescently couple optical energy into or out of a core of said optical fiber; and a second fiber coupling port formed in another fiber portion of said optical fiber by removing at least part of fiber cladding to evanescently couple optical energy into or out of a core of said optical fiber.

16. The device as in claim 15, further comprising a buffer layer formed between said first elongated groove and said optical fiber operable to reduce a mechanical or thermal stress between said optical fiber and said substrate.

* * * * *